(12) United States Patent
Burrier et al.

(10) Patent No.: US 8,407,617 B2
(45) Date of Patent: Mar. 26, 2013

(54) PROVIDING A VISUAL REPRESENTATION OF VARIOUS RESOURCES RELATED TO PASSAGES OF CLASSIC LITERATURE

(75) Inventors: Douglass Lee Burrier, Kennesaw, GA (US); Michael Edward Jutzin, Acworth, GA (US); Gordon Shannon Darrah, Acworth, GA (US)

(73) Assignee: Visual Study Bible, LLC, Kennesaw, GA (US)

(*) Notice: Subject to any disclaimer, the term of this patent is extended or adjusted under 35 U.S.C. 154(b) by 265 days.

(21) Appl. No.: 12/879,526

(22) Filed: Sep. 10, 2010

(65) Prior Publication Data
US 2011/0066970 A1  Mar. 17, 2011

Related U.S. Application Data

(60) Provisional application No. 61/241,807, filed on Sep. 11, 2009.

(51) Int. Cl.
*G06F 3/048* (2006.01)
(52) U.S. Cl. ........................................ 715/782
(58) Field of Classification Search ................... 715/782
See application file for complete search history.

(56) References Cited

U.S. PATENT DOCUMENTS

| | | | |
|---|---|---|---|
| 7,231,384 B2* | 6/2007 | Wu et al. ................................. | 1/1 |
| 7,424,701 B2* | 9/2008 | Kendall et al. ................. | 717/105 |
| 2003/0174168 A1* | 9/2003 | van Leersum ................ | 345/764 |
| 2009/0249453 A1* | 10/2009 | Cluck et al. ....................... | 726/5 |
| 2010/0088621 A1* | 4/2010 | Paley ............................. | 715/764 |
| 2010/0293498 A1* | 11/2010 | Maxfield ....................... | 715/776 |

OTHER PUBLICATIONS

BibleWorks, BibleWorks.com, Dec. 2006, BibleWorks LLC, pp. 1-27.*
Article entitled "Tips and Tricks: Get the most out of the Visual Thesaurus", located at http://www.visualthesaurus.com, Sep. 6, 2009, 58 pgs.

* cited by examiner

*Primary Examiner* — Stephen Hong
*Assistant Examiner* — James G Pohlman
(74) *Attorney, Agent, or Firm* — Taylor English Duma LLP

(57) ABSTRACT

Systems and methods for providing graphical representations of resources related to passages of classic literature are provided. According to one implementation, a graphical user interface (GUI) is provided in which the GUI includes a search field configured to enable a user to enter a search term. The search term may be recognized as a subject focus element. The GUI also includes a bloom diagram window configured to display an initial bloom diagram having the subject focus element at a center location and resource elements related to the subject focus element at locations surrounding the center location. A passage window is configured to display one or more passages of a classic literary work, wherein the passages related to the subject focus element. Also, the GUI includes a resource window configured to display a description of the resource elements.

13 Claims, 28 Drawing Sheets

PROVIDING A VISUAL REPRESENTATION OF VARIOUS RESOURCES RELATED TO PASSAGES OF CLASSIC LITERATURE

CROSS-REFERENCE TO RELATED APPLICATIONS

This application claims the benefit of U.S. Provisional Application No. 61/241,807, filed Sep. 11, 2009, the entire disclosure of which is incorporated by reference herein.

TECHNICAL FIELD

The present disclosure generally relates to various resources that are used for describing passages of classic literature and more particularly relates to providing a visual representation of these resources.

BACKGROUND

Classic literature is often researched and studied by scholars at various education levels. A wealth of research by respected authors and scholars exists to help people understand many different aspects of the literature. Usually, the most significant literary works throughout history have received the greatest amount of scrutiny and therefore have inspired a large volume of helpful resources. For example, the Bible has been researched by many great scholars who have provided valuable resources for enabling a better understanding of the Bible. Different resources are available for defining words of the Bible, providing translation information, providing commentaries of passages of the Bible, background information, and other aspects of this classic literary work.

SUMMARY

The present disclosure describes systems and methods for linking various resources relating to passages of classic literature and providing visual representations of the resources. In some implementations, a graphical user interface (GUI) is provided in which the GUI includes a search field configured to enable a user to enter a search term. The search term, for example, may be recognized as a subject focus element. The GUI includes a bloom diagram window that is configured to display an initial bloom diagram having the subject focus element at a center location and resource elements related to the subject focus element at locations surrounding the center location. Also, the GUI includes a passage window, which is configured to display one or more passages of a classic literary work, the passages being related to the subject focus element. The GUI further includes a resource window configured to display a description of the resource elements.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
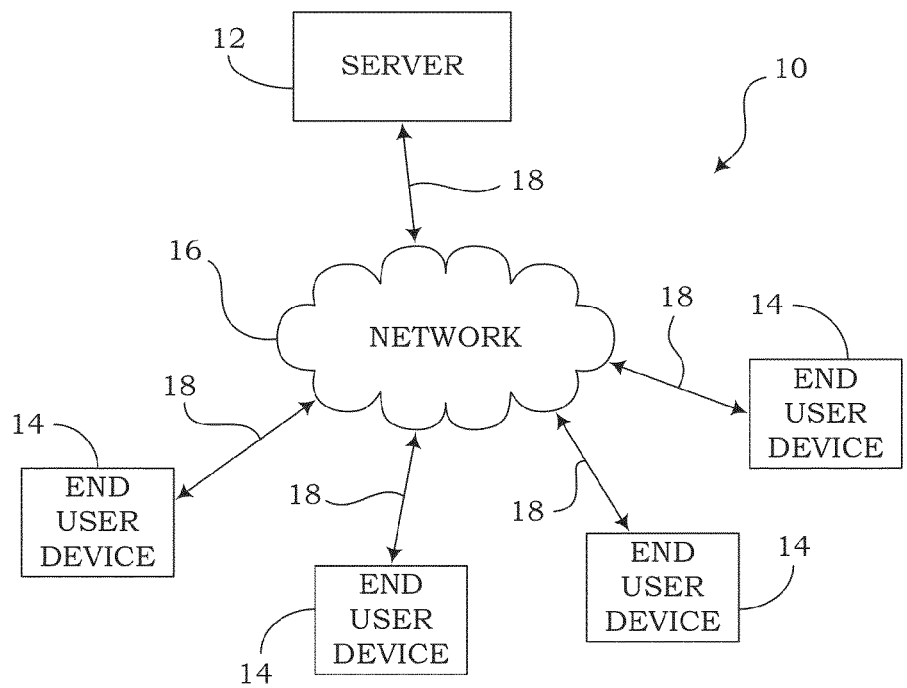
FIG. 1 is a block diagram illustrating a communication system according to various implementations of the present disclosure.

The present disclosure describes systems, methods, and software programs for visually representing various resources that provide insight into the meaning and understanding of passages in classis literature. For example, many resources are available that describe different passages, or verses, of the Bible. Various implementations of the present disclosure are configured to combine multiple resources (e.g., dictionaries, thesauruses, Hebrew and Greek translations, concordance information, Bible commentaries from respected scholars, cross-references, the verses of the Bible itself, and other resources). Links are created for defining the relationships between the resources and a visual representation of how these resources are linked is displayed. Particularly, a subject focus element (e.g., an English, Hebrew, or Greek word, a Bible verse, a topic, etc.) can be entered or selected by a user. In response, the systems, methods, and software programs of the present disclosure are configured to present a diagram showing the subject focus element at a center location and links to the various resources surrounding the subject focus element. In this respect, this resource diagram tool may enable a Bible scholar to better understand God's Word.

The resource diagram tool of the present disclosure is configured to help users see the Bible in a way that they may not have seen before. By providing related resources in one screen, the user can "connect the dots" of what the Bible teaches. Second, the resource diagram tool automatically presents the related content at the same time and in the same window. In some ways, the resource diagram tool works the way that a user's mind might work, increasing his/her understanding while removing some of the traditional barriers to Bible Study. In the past, some students of the Bible may have become overwhelmed, discouraged, or frustrated when using certain resources to study the Bible. The resource diagram tool described herein, however, removes the barriers of searching through complex materials and makes the material immediately accessible in an easy-to-use and easy-to-understand format.

Many of the implementations of the present disclosure describe Bible resources and how the resources are linked with respect to verses in the Bible. However, it should be understood that the same principles as described herein may also be applied to resources available with respect to passages of other classic literature as well. It should be noted that certain modification can be made when these principles are applied to other classic literature. For example, literature originally written in a modern language (e.g., English) does not require translation from an ancient language as is the case with the Bible. Therefore, the examples of English translations of Hebrew and Greek words described herein may be unnecessary with some literature. In some embodiments, the translation principles described herein may refer to similar translation processes from one modern language to another (e.g., English to French). It should also be noted that the principles described herein with respect to the Bible and the respective resources may apply to other classic literature and the resources available associated with the respective literary works. Other features and advantages will be apparent to one of ordinary skill in the art upon consideration of the general principles described herein, and all such features and advantages are intended to be included in the present disclosure.

FIG. 1 is a block diagram showing an embodiment of a communication system 10. As illustrated, the communication system 10 according to this embodiment includes a server 12 and a number of end user devices 14. The server 12 is configured to communicate data, information, files, signals, etc. to the end user devices 14, and vice versa, via a network 16, which connects the devices together either by wired or wireless communication lines 18.

The server 12 in this example may be a web server for operating a web site that may be accessed by the end user devices 14. Computer programs may be stored at various locations in the communication system 10, such as on the server 12, on the end user device 14, or at other locations accessible via the network 16. According to the present disclosure, the computer programs described herein are configured to enable a user to enter or select an item that is to be the focus of a resource diagram. The entered or selected element is referred to herein as a "subject focus element" and may be a modern language word (e.g., an English word, Spanish word, French word, etc.), an ancient language word (e.g., a Hebrew word, Greek word, Latin word, etc.), a passage of a classic literary work (e.g., a verse of the Bible), a topic, or other items. The computer programs are configured to determine the relevant resources pertaining to the subject focus element and provide a diagram showing the subject focus element along with links to the related resources. According to various implementations, the subject focus element may be displayed in a center location of the diagram with the related resource links surrounding the subject focus element. It has been observed that in some respects the configuration of words in the resource diagram resembles a flower in bloom and therefore may be referred to as a "bloom diagram."

Figure 2:
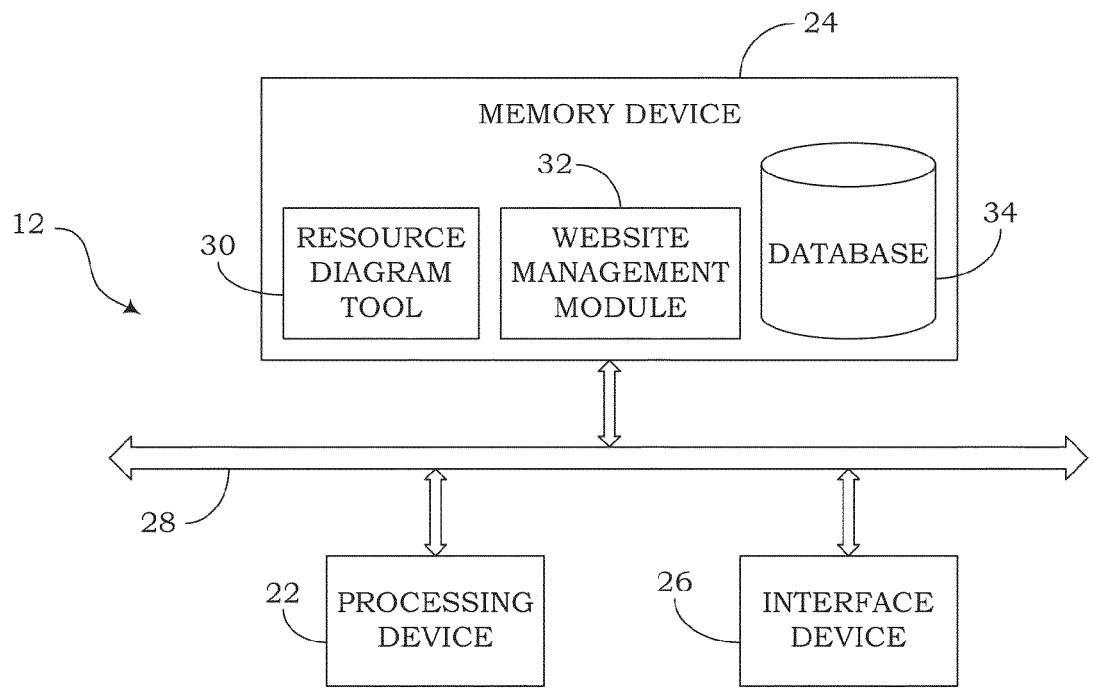
FIG. 2 is a block diagram illustrating the server shown in FIG. 1, according to various implementations.

FIG. 2 is a block diagram showing an embodiment of the server 12 shown in FIG. 1. In this embodiment, the server 12 includes a processing device 22, a memory device 24, and an interface device 26, each interconnected via a bus 28. The memory device 24 includes a resource diagram tool 30, a web site management module 32, and a database 34. In some embodiments, the elements of the memory device 24 may be stored on different computer systems. The resource diagram tool 30 is configured to access the database 34 to retrieve resources that are related to a specific subject focus element. The resource diagram tool 30 is also configured to generate a resource diagram (e.g., bloom diagram) that can be displayed as part of a graphical user interface (GUI).

The web site management module 32 is configured to manage a resource diagram web site associated with providing resource services to members. For example, the web site management module 32 may have a home page that describes the general aspects of the resource diagram web site and allows a user to navigate to web pages of interest. The web site management module 32 may also include pages for enabling a user to subscribe for membership. A member may then utilize the resource diagram tool 30 and other software or features of the web site. In some embodiments, the web site management module 32 may be configured to download data to the member's end user device 14 and receive information from the end user device 14. The member may also save studies made using the resource diagram tool 30 and share the studies with other members. The web site management module 32 may also include other features that are made available to users with a membership.

The web site management module 32 may also provide trial memberships to allow a person to try the resource diagram tool 30 for a period of time to determine if he/she wishes to purchase a subscription. Also, the web site management module 32 provides a community network allowing the members to interact with each other, share studies with each other, etc. The web site management module 32 may also include a database management system for controlling the data that is stored in the database 34. Tutorials of how the resource diagram tool 30 is used may also be part of the web site management module 32. The web site management module 32 provides a web presence where people can share ideas, participate in Bible studies, learn from great authors, ask questions from peer members, leaders, and mentors, and perform other actions.

The database 34 includes data with respect to words that may be searched (e.g., English words, Greek words, Hebrew words). Also, the database 34 may include data with respect to topics. For example, certain topics may be associated with certain verses in the Bible or certain words used in the Bible. The database 34 also includes a vast amount of resources that are used for defining or describing the words or verses that the user may wish to focus on. The resources, for example, may contain definitions of words, cross-references, commentaries from respected scholars, verses, etc. Information regarding the relevance of various resources with each other is also stored. In addition, the database 34 may include membership information for identifying the people who have subscribed to the community. The database 34 may also store personal studies that users have saved, thereby allowing the users to go back to the studies at a later time or to share his/her findings with other members. The database 34 may also store community studies to which many people may have contributed and discussions or research on one or more subjects.

The resource diagram tool 30 and web site management module 32 of the present disclosure may be implemented in hardware, software, firmware, or any combinations thereof. In the disclosed embodiments, the resource diagram tool 30 and web site management module 32 may be implemented in software or firmware that is stored in memory (e.g., memory device 24) and that is executable by a suitable instruction execution system (e.g., processing device 22). If implemented in hardware, the resource diagram tool 30 and web site management module 32 may be implemented using discreet logic circuitry, an application specific integrated circuit (ASIC), a programmable gate array (PGA), a field programmable gate array (FPGA), or any combinations thereof.

The resource diagram tool 30 and web site management module 32 may comprise an ordered listing of executable instructions for implementing logical functions and may be embodied in any computer-readable medium for use by an instruction execution system or device, such as a computer-based system, processor-controlled system, etc. In the context of the present disclosure, a computer-readable medium can be any medium that can contain, store, communicate, propagate, or transport programs for execution by the instruction execution system or device. Examples of computer-readable media may include electronic, magnetic, electromagnetic, optical, infrared, or other forms of media systems or devices.

It should be understood that the routines, steps, processes, or operations described herein may represent any module or code sequence that can be implemented in software or firmware. In this regard, these modules and code sequences can include commands or instructions for executing the specific logical routines, steps, processes, or operations within physical components. It should further be understood that two or more of the routines, steps, processes, and/or operations described herein may be executed substantially simultaneously or in a different order than explicitly described, as would be understood by one of ordinary skill in the art.

Figure 3:
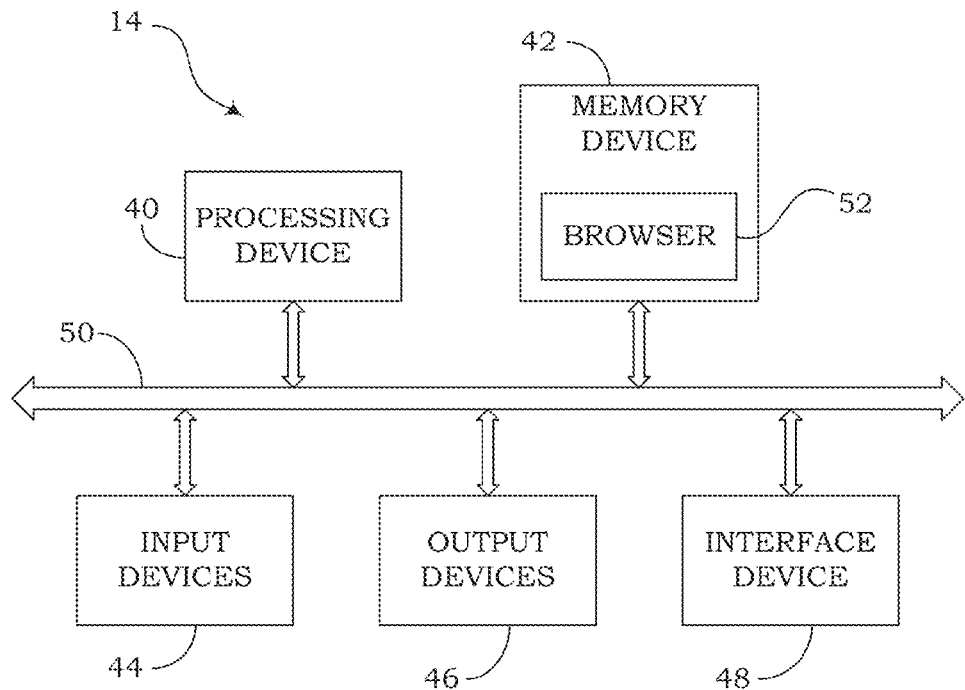
FIG. 3 is a block diagram illustrating one of the end user devices shown in FIG. 1, according to various implementations.

FIG. 3 is a block diagram showing an embodiment of one or more of the end user devices 14 shown in FIG. 1. In this embodiment, the end user device 14 includes a processing device 40, a memory device 42, input devices 44, output devices 46, and an interface device 48, each interconnected via a bus 50. The memory device 42 may include, among other things, a browser 52. The browser 52 may be configured to visit the resource diagram web site associated with the resource diagram tool 30 and utilize the resource diagram tool 30 if the user is a member. Therefore, the resource diagram web site may require the user to have a membership or subscription to gain access to the certain programs on the web site. The browser 52 may also receive temporary files downloaded from the resource diagram web site during operation and/or may reply to requests for cookies from the web site.

Processing devices 22 and 40 may be general-purpose or specific-purpose processors or microcontrollers for controlling the operations and functions of the respective devices. In some implementations, processing devices 22 and 40 may each include a plurality of processors for performing different functions within the respective devices.

Memory devices 24 and 42 may each include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc. The database 34 may include multiple databases in some embodiments.

Input devices 44 may include various input mechanisms or data entry devices (e.g., keyboards, keypads, buttons, switches, touch pads, touch screens, cursor control devices, computer mice, stylus-receptive components, voice-activated mechanisms, microphones, cameras, infrared sensors, or other data entry devices). Output devices 46 may include various data output devices (e.g., computer monitors, display screens, touch screens, speakers, buzzers, alarms, notification devices, lights, light emitting diodes, liquid crystal displays, visual display devices, audio output devices, printers, or other data output devices). The input devices 44 and output devices 46 may also include devices configured to both receive input and provide output, such as interaction devices, dongles, touch screen devices, and other input/output devices, to enable input and/or output communication.

With the system described with respect to FIGS. 1-3, the resource diagram tool 30 allows the user to conduct a search for a word, Bible verse, topic, or other item. The subject focus element may be entered using one or more input devices 44 (e.g., keyboard, mouse, etc.). The interface device 48 allows the processing device 40 to communicate with the server 12 to communicate information, access files, etc. The output devices 46 may include a display device configured to display a graphical user interface (GUI) that shows the resource diagram, or bloom diagram. The bloom diagram is a picture having the subject focus element at the center and a number of related resources surrounding the subject focus element.

Figure 4:
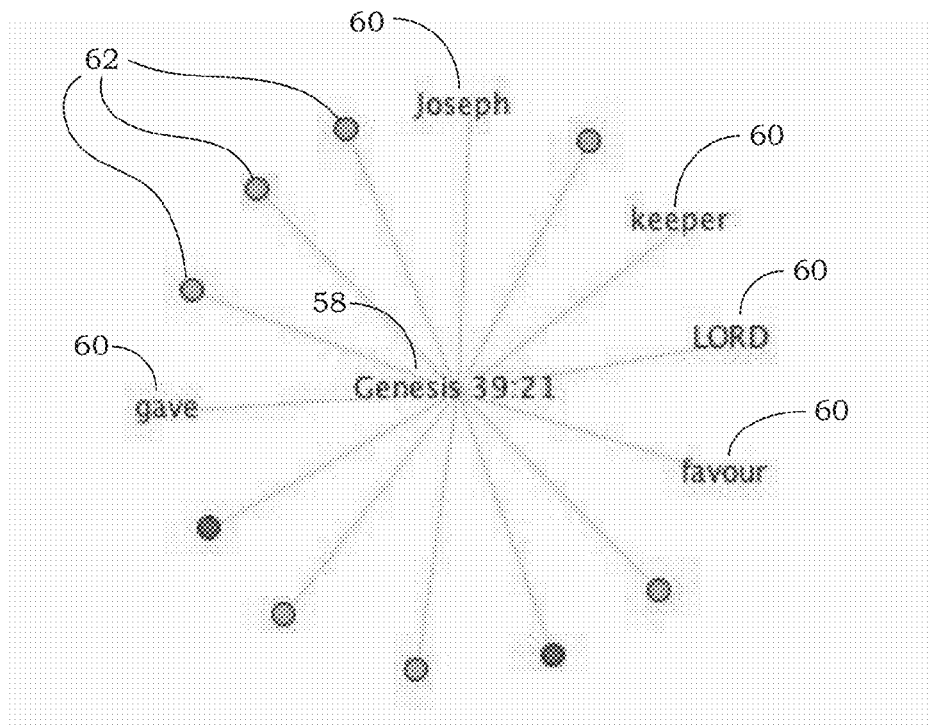
FIG. 4 is a diagram illustrating an example of a bloom diagram, according to various implementations.

For example, FIG. 4 shows a bloom diagram 56 of a search on the verse Genesis 39:21, which in the King James version states, "But the LORD was with Joseph, and showed him mercy, and gave him favour in the sight of the keeper of the prison." In this example, the subject focus element 58 (i.e., "Genesis 39:21") is shown in the center of the bloom diagram 56. The bloom diagram 56 may present any combination of words 60 and dots 62. The words 60 represent those words contained in the subject verse and are configured as links to resources associated with the respective words. The dots 62 are also configured as links to various resources. The resource links 60 and 62 are displayed around the subject focus element 58 in the bloom diagram 56. Some of the displayed words 60 of the verse may be cross-reference topics related to the verse. If the user selects (e.g., clicks on) one of the links 60 or 62, the selected item becomes a new subject focus element of a new bloom diagram.

Figure 5:
FIG. 5 is a diagram illustrating a screen shot of a first graphical user interface (GUI) related to a web page and a second GUI related to a resource diagram tool, according to various implementations of the present disclosure.

FIG. 5 is a diagram showing a screen shot of a GUI 70 associated with a home page of a resource diagram web site. The GUI 70 enables the execution of the resource diagram tool 30 according to various implementations. As illustrated, the GUI 70 includes, among other things, navigation links for navigating to different web pages of the resource diagram web site. The navigation links include a Home link 72, a Plans and Prices link 74, a Tutorials link 76, a My WordBloom! link 78, and a support link 80. The GUI 70 also includes other links 82 for enabling the user to perform certain actions or access certain information. Also, a start link 84 labeled "Start Your Search" is included in the GUI 70 to allow the user to run the resource diagram tool 30. When the start link 84 is selected, the system opens another GUI 90 that renders an interactive display of the resource diagram tool 30. The GUI 90 in this example is shown superimposed over a portion of the GUI 70 and in some embodiments may be minimized, maximized, or changed in width or height as desired.

According to the embodiment shown in FIG. 5, GUI 90 includes a Bible passage window 92 having a first version pane 94, a second version pane 96, and a third version pane 98. In this example, the first version pane 94 shows passages of the Bible from the King James Version (KJV), which is one of the most trusted, conservative and accurate translations available, dating back to 1611 and revised for language since that time. The second version pane 96 shows passages of the Bible from the New American Standard Bible (NASB) version, which is a contemporary language word-for-word translation from Hebrew and Greek and is second in use only to the King James Version. It is considered as the standard for current scholars. The third version pane 98 shows passages of the Bible from the New Century Version (NCV), which is a contemporary thought-for-thought translation used by the Billy Graham Evangelistic Association and is easy to read and understand. By default, these three standard versions are selected. The user may also be able to select which versions are shown in each version pane, the order of the versions, and how many of the different versions are displayed at one time in the Bible passage window 92. Other versions of the Bible may be available depending on the user's preference. For example, the user may wish to view Bible passages as translated in the New International Version (NIV), or other versions.

According to some implementations, the subject focus element in the bloom diagram may be a word and each Bible version pane 94, 96, 98 is configured to display one or more Bible verses that include the word. If the subject focus element is a word, that word may be in any modern language (e.g., English, Spanish, French, German, etc.) or any ancient language (e.g., Hebrew, Greek, Latin, etc.). In some examples, the subject focus element is a Bible verse and each Bible version pane 94, 96, 98 is configured to display a number of Bible verses preceding the subject Bible verse followed by the subject Bible verse, which in turn is followed by a number of Bible verses after the subject Bible verse. For example, the Bible version panes 94, 96, 98 may each display 11 verses (e.g., five verses before the subject verse, the subject verse, and then five verses after the subject verse).

The GUI 90 also includes a bloom diagram window 100 where a bloom diagram is displayed. According to various implementations, the bloom diagram window 100 may present the subject focus element at a center location of the bloom diagram and a number of related resources surrounding the subject focus element.

The GUI 90 also includes a resource window 102, which contains a cross-reference pane 104, a definitions pane 106, and a thoughts pane 108. The cross-reference pane 104 may display any available cross-reference elements, such as related Bible verses, topics related to the subject focus element, or other cross-references. The definitions pane 106 may display definitions of the subject focus element, definitions of words related to the subject focus element, and/or definitions of words indirectly related to the subject focus element. For example, definitions of Greek or Hebrew words that are translated into the subject focus element may be displayed in the definitions pane 106. The thoughts pane 108 may contain notes and commentaries of passages of the Bible from respected Bible scholars and seasoned authors about the subject focus element. One or more of the resource elements in the bloom diagram may be represented as dots, wherein the dots may be visually coded to correspond to one of the cross-reference pane 104, the definition pane 106, and the thoughts pane 108. The subject focus element may be a cross-reference element selected from the cross-reference pane 104 or from a dot representing the respective cross-reference element. In this case, the resource elements in the bloom diagram may include Bible verses related to the cross-reference element.

Furthermore, GUI 90 includes navigation buttons and actions buttons along a top portion thereof. For example, a back button 110 and forward button 112 allow a user to navigate to previous diagrams or later diagrams in the bloom diagram window 100 during the current study session. The GUI 90 also includes a search field 114 allowing a user to enter a term, Bible verse, etc. A search button 116 may be used to initiate the search for the subject that is entered in the search field 96. If the user wishes to print the information in the bloom diagram window 100, the user may select the print button 118. To share study information with another person via e-mail, the user may select the share button 120. In addition, the GUI 90 also includes a 3D mode button 122, which causes the bloom diagram in the bloom diagram window 100 to be displayed in a three-dimensional manner. For example, in 3D mode, portions of the bloom diagram on a "near" side may be highlighted (e.g., darker, larger, etc.) whereas the portions "farther" away are diminished (e.g., lighter, smaller, etc.).

The GUI 90 also includes a search suggestion pull-down button 124, a search history pull-down button 126, a study list pull-down button 128, and a reader pull-up button 130. The search suggestion button 124 allows the user to drag open a search suggestion window showing a list of words, verses, topics, etc. that may be related to the subject focus element. If an item in the list is selected by the user, the resource diagram tool 30 changes the current bloom diagram to another bloom diagram that is centered around the selected item, which then becomes the new subject focus element.

The search history pull-down button 126 allows the user to drag open a window showing a list of the search history. By selecting one of the items in this list, the resource diagram tool 30 re-creates the selected bloom diagram. The study list pull-down button 128 allows the user to drag open a window showing a list of studies that have been saved. A user may also click and drag items into the window for saving new study lists. The reader pull-up button 130 may be clicked and dragged to open a reading window or the reading window may be opened automatically when a lengthy comment from the thought pane 108 is selected. The reading window allows the text of a lengthy resource (e.g., commentary, thought, definition, etc.) to be shown in an area large enough for the user to easily see.

In operation, the resource diagram tool 30 is configured to provide graphical and textual information to the end user device 14 such that a display device associated with the end user device 14 may display the GUI 90. The GUI 90 allows a user to view the bloom diagram, scroll through windows and panes of the GUI 90, select new subject focus elements, etc. According to various implementations, the user is enabled to enter an initial search term, which is recognized as the subject focus element. The bloom diagram window 100 is configured to display an initial bloom diagram having the subject focus element at a center location and resource elements related to the subject focus element at locations surrounding the center location. The Bible passage window 92 is configured to display one or more Bible verses related to the subject focus element and the resource window 102 provides a description of the related resource elements.

In some embodiments, each of the resource elements in the bloom diagram includes a link, enabling the user to select one of the resource elements as a new subject focus element. When selected, the bloom diagram window 100 is further configured to remove the current bloom diagram and display a new bloom diagram with the new subject focus element displayed at the center location and new resource elements related to the new subject focus element at locations surrounding the center location. The bloom diagram may also include lines drawn from the subject focus element at the center location to the resource elements. The bloom diagram may further include second-level resource elements related to and surrounding one or more of the resource elements.

According to some embodiments, the subject focus element may be an English word and at least some of the resource elements may include one or more Greek or Hebrew words that are translated into the English word. Also, some resource elements may be definitions of the English word and others may include commentaries, notes, or thoughts from respected Bible scholars. In some embodiments, the subject focus element may be an ancient language word (e.g., Greek, Hebrew, etc.) and the resource elements include one or more English words translated from the ancient language word. In some embodiments, the subject focus element may be a Bible verse and the resource elements include English words found in the Bible verse. The resource elements in this case may also include definitions of the English words, cross-reference elements of the English words, and commentaries, notes, or thoughts from respected Bible scholars.

The GUIs 70 and 90 shown in FIG. 5 and portions of GUIs 70 and 90 are shown in FIGS. 6-27 with a variety of examples to help illustrate various aspects of the resource diagram tool 30. In some implementations, the resource diagram tool 30 may include a feature to provide assistance to the user for the different features. For example, when the user hovers a mouse over the different buttons, bars, areas, or windows, pop-ups are displayed to provide tips, instruction, etc., about the respective element. This feature can be turned on or off using a "Help" button that may be located on a top toolbar of GUI 90. For additional assistance, the user can access complete instructions from Web Tutorials (e.g., by selecting the tutorial link 76). Also, a complete manual may be downloaded from the resource image web site.

According to various embodiments, the resource diagram tool 30 may send information to the end user device 14 for identification purposes. For example, the information may be a cookie or other small amounts of data that may include an anonymous unique identifier. This information may be received from the server 12 by the browser 52 of the end user device 14 and stored in the memory device 42. Cookies or other similar types of data may be used to remember the user's settings and allow customization based on the user's preferences. In some embodiments, the resource diagram tool 30 may be programmed using JAVA or other languages, instruction sets, computer code, etc., which is configured to run Web and Desktop based programs.

For security purposes, most computers do not allow external programs to access portions of the computers, such as the clipboard (for copying and pasting items), printers, etc., without the permission from the computer owner. The resource diagram tool 30 may request the user's approval by a certificate allowing such control. The approval may be made each time the program is used or a permanent certificate may be agreed upon.

Words and verses, along with comments, can be saved by the user. Also, the user can share what has been saved. Saved words, studies, verse lists, etc. can be shared in various ways, such as by e-mail, by using Twitter™, by posting on Facebook™, etc.

The web site management module 32 may also be configured to automatically reach out to the members if they wish. For example, the web site management module 32 may deliver a "Word of the Day" to the members' e-mail address. In addition, a monthly newsletter may be sent to members showing study tips, interesting Bible facts, ideas, etc.

Figure 6:
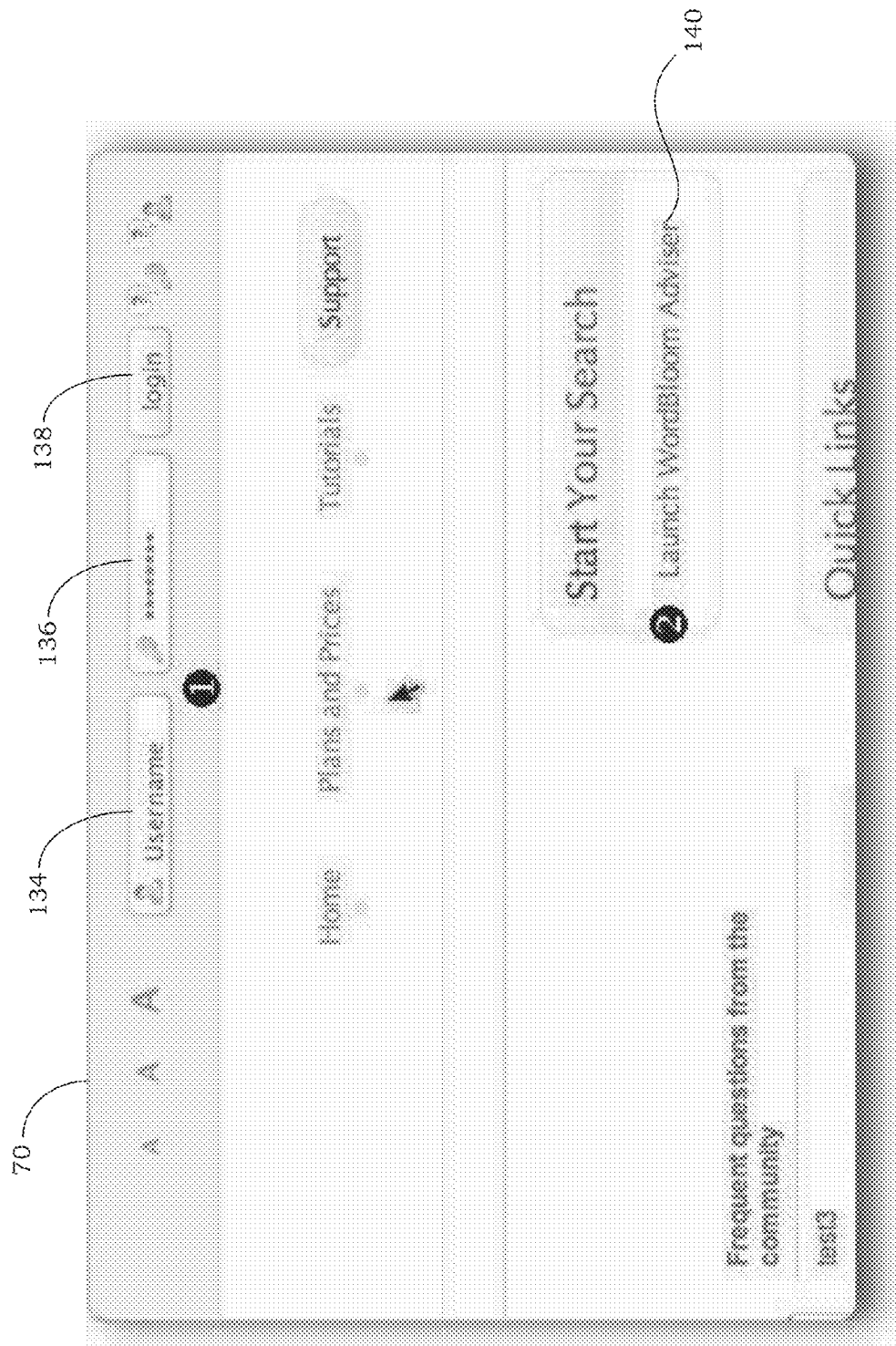
FIGS. 6-27 are diagrams illustrating portions of screen shots of the GUIs shown in FIG. 5, according to various implementations.

FIG. 6 is a diagram illustrating an embodiment of the GUI 70 shown in FIG. 5 for logging in to the membership account. To log in, the user enters his or her username in a username field 134, enters a password in a password field 136, and then clicks on a login button 138. Logging in to the web account opens Community and Sharing features of the resource diagram web site associated with the resource diagram tool 30. With a membership, the user has unlimited use of the resource diagram tool 30 for the length of time of the membership (e.g., one year). The resource diagram tool 30 is configured to be launched from the resource diagram web site and opens up in its own window when the user clicks a launch button 140.

Figure 7:
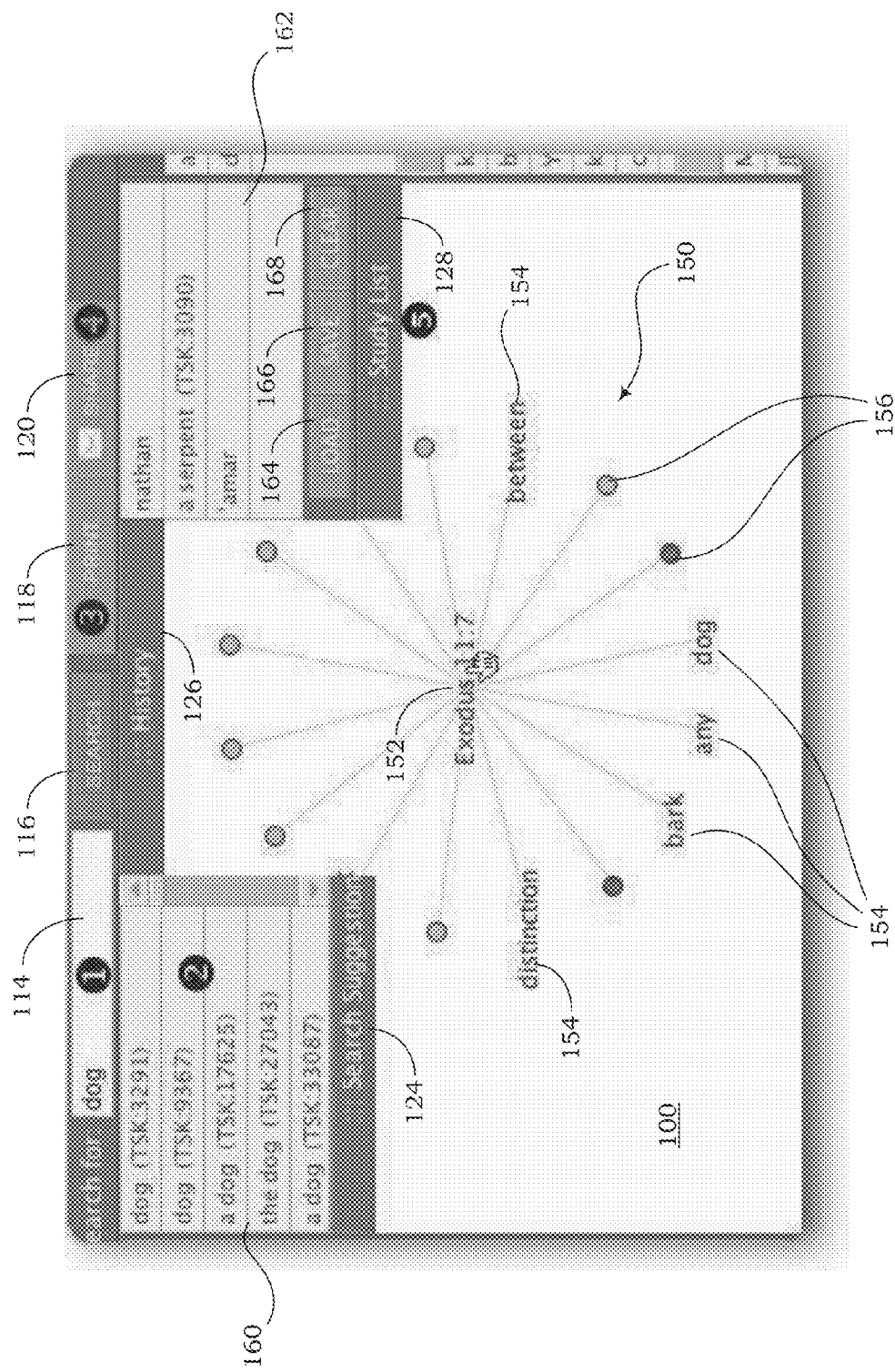

FIG. 7 is a diagram of an embodiment of the GUI 90 illustrating various searching features. To initiate a search, the user may enter a word or verse into the search field 114 and click the search button 116. In response to a search for the word "dog," for example, a bloom diagram is displayed with the word "dog" in the center as the subject focus element.

In the Bible passage window 92, whole verses of the Bible that contain the word "dog" are displayed. In this example, the user has clicked on the verse "Exodus 11:7" and a new bloom diagram 150 is displayed in the bloom diagram window 100. The bloom diagram 150 includes a subject focus element 152 (e.g., Exodus 11:7), word resources 154, and dots 156. Specifically, the subject focus element "Exodus 11:7" is a verse that reads "But against any of the children of Israel shall not a dog move his tongue, against man or beast: that ye may know how that the LORD doth put a difference between the Egyptians and Israel." Some of the word resources 154 may be words from the Bible passage as contained in the various versions. The dots 156 may be displayed using a color coding scheme or other encoding to distinguish one type of resource from another. For example, a dark color may be used to identify resources related to cross-references, a medium brightness color may be used to identify resources related to thoughts, and a light color may be used to identify resources related to definitions.

From the current bloom diagram 150, the user may wish to continue searching for other resources related to the search term "dog." The user may view other search suggestions based on the entered search word. In this case, the user may drag the search suggestions button 124 to reveal a search suggestion window 160 including a list of search suggestions. The resource diagram tool 30 may be configured to list up to a maximum number (e.g., 100) of suggested items.

Other options are available to the user. For example, the user may wish to print the bloom diagram 150 using the print button 118 or send a picture of the bloom diagram 150 to a friend using the share button 120. While searching, the user may wish to save words, verses, and/or resources for future use. If so, the user may drag the study list button 128 to open a study list window 162 listing a number study lists. The study list window 162 also includes a load button 164, a save button 166, and a clear button 168. The user may save the study list by clicking the save button 166, clear the window by clicking the clear button 168, or load a saved study list by clicking the load button 164.

Saving work can be helpful if the user wants to finish a study at a later time or if the user wants to share words and verses with a study group or small group. The user may also add comments to the saved work. The study items are saved in the Study List window 162 and can be retrieved to continue working with them again. The user may also delete items from the list or delete the entire list. Being able to save work may be extremely useful, especially for teachers, because it may allow them to prepare a study list or presentation and save it on the resource diagram web site and then load it in a classroom environment to present to students. Using a Study Detail web page, the user may add more comments to each item in the Study List. This may be beneficial when printing or sharing a study before a small group or Bible study class. It may also be useful to merely track the user's own thoughts. The Study Detail web page may allow selection of a study from the Study List to which the user may wish to add detail. The user may then enter comments in a text box next to a study item.

There are three types of searches that may be made by the resource diagram tool 30—words, verses, and advanced resources. When a word is entered, the resource diagram tool 30 is configured to find the best matches for the word. The word may be a modern language word (e.g., English, Spanish, French, German, etc.) or may even be an ancient language word (e.g., Greek, Hebrew, etc.). The bloom diagram window 100 centers the word in the window and builds a bloom diagram around the word. If the search term is a word in the Bible (not a topic search), the word appears as the subject focus element 152. The resource diagram tool 30 is configured to display definitions and synonyms surrounding the word.

The resource diagram tool 30 enables the user to resize various areas or windows of the GUI 90 as desired. Also, related items may be toggled "on" or "off," depending on whether the user wishes to see the items or not. The resource diagram tool 30 automatically adds/removes these items to/from the bloom diagram 150.

Figure 8:
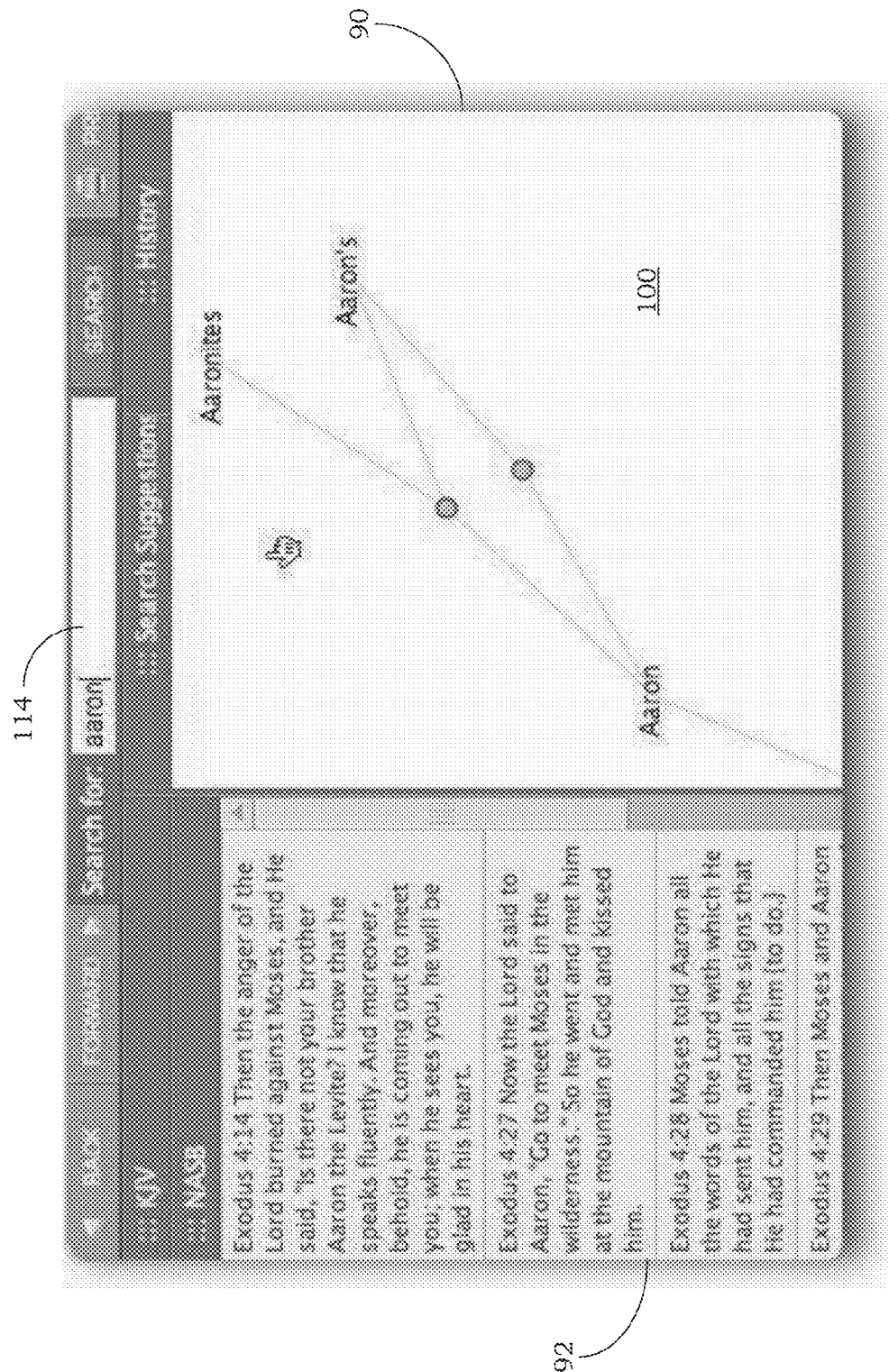
Figure 9:
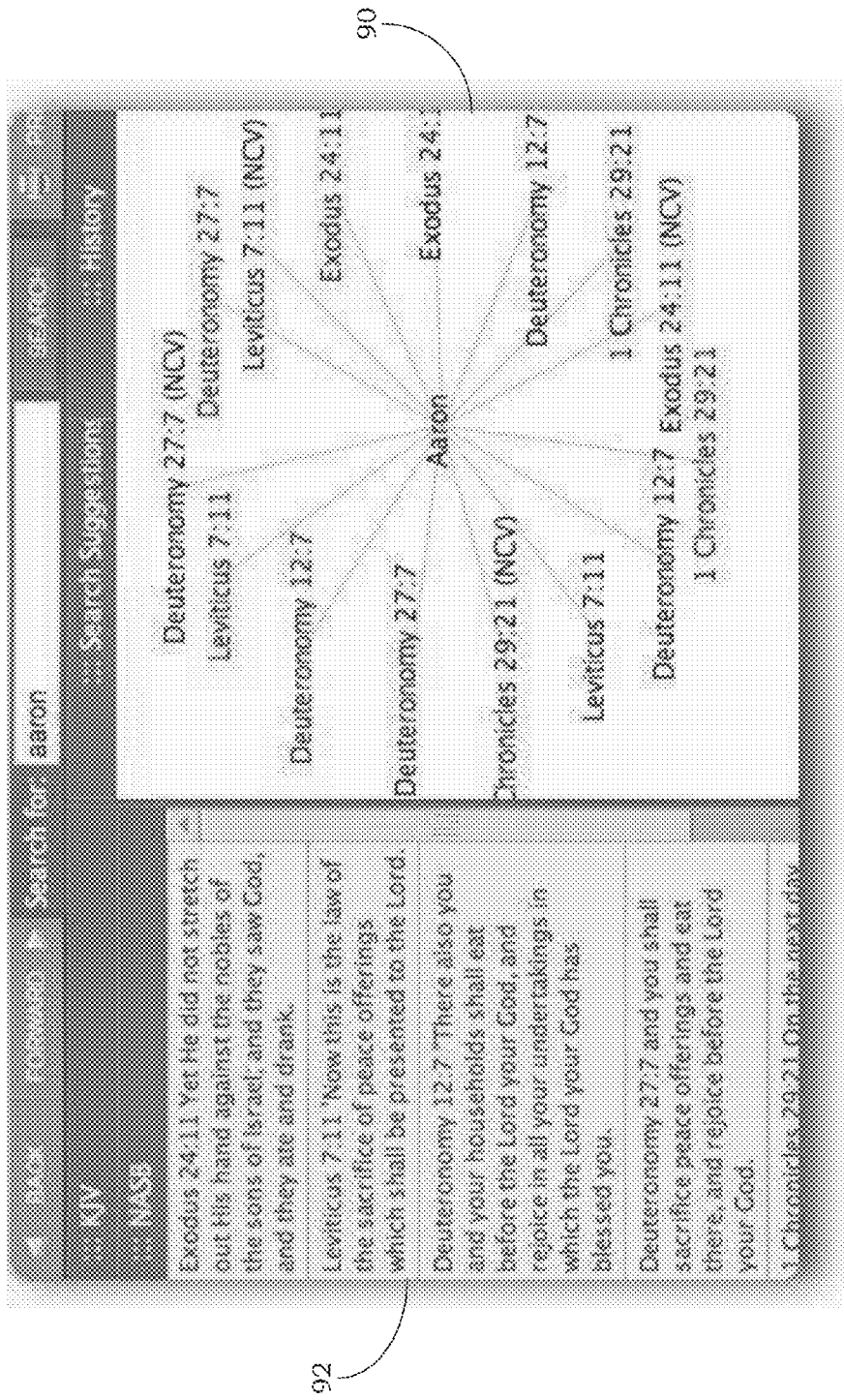

FIGS. 8 and 9 show examples of the difference between searching for a term and searching for a topic. In FIG. 8, a search term is entered in the search field 114 and the Bible passage window 92 displays the verses of the Bible where that the word appears. For example, this is a term search to search for the term "Aaron." The verses where "Aaron" appears in the Bible are displayed to show the search term used in context.

On the other hand, topics may be displayed in the cross-reference pane 104 of the resource window 102 (FIG. 5). When a topic is selected (e.g., by clicking on the topic word in the reference pane 104 or by clicking the dot associated with the topic word), the resource diagram tool 30 displays the topic as the subject focus element and surrounds the topic with the verses in the Bible in which the topic applies, as illustrated in FIG. 9. In this example, "Aaron" is the topic and the verses in the Bible related to the topic Aaron are displayed in the Bible passage window 92. It should be noted that the verses do not necessarily include the term "Aaron" in the verse itself but is related to the topic of "Aaron."

Figure 10:
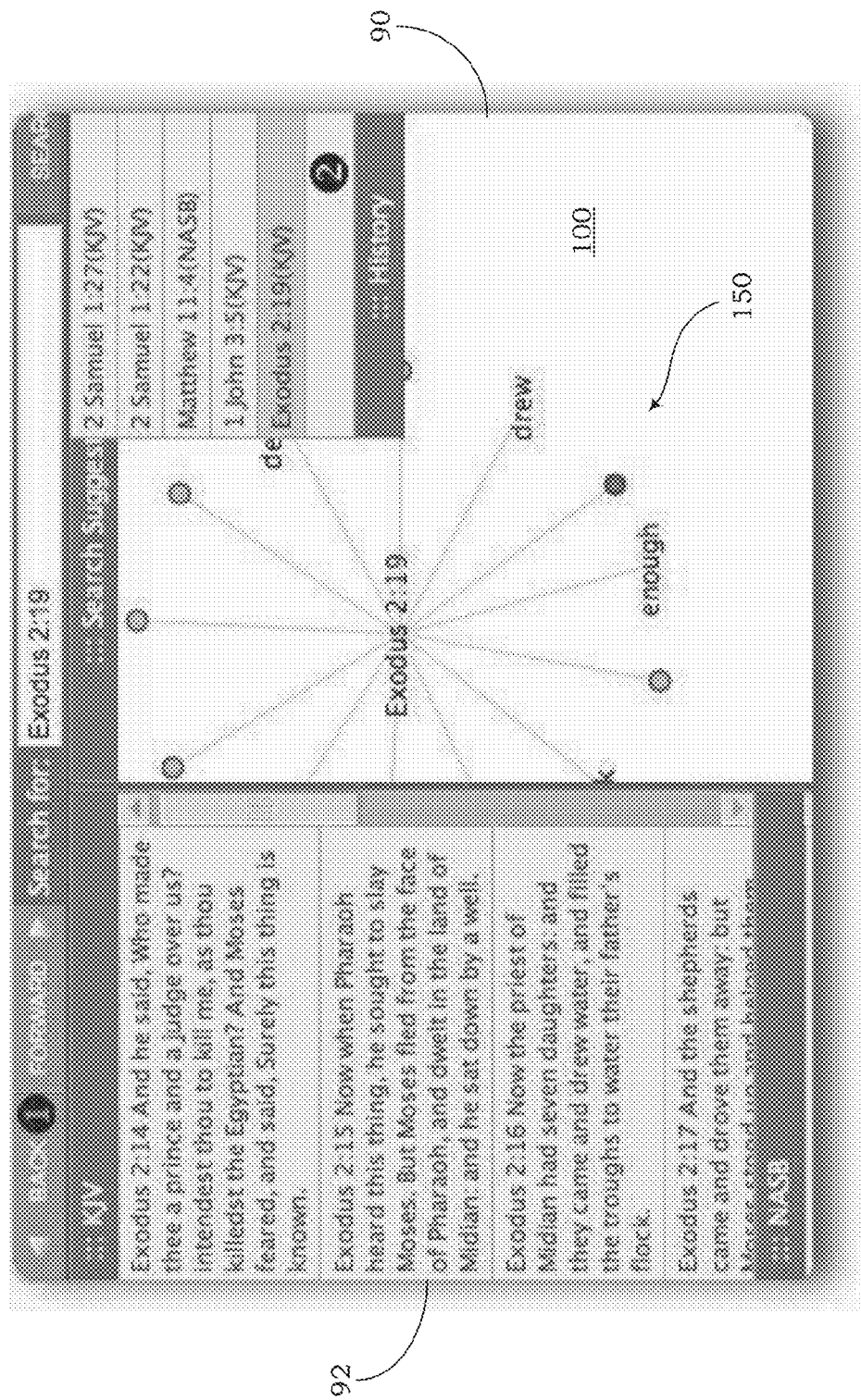

As illustrated in FIG. 10, if a verse is selected as the subject focus element, the resource diagram tool 30 displays a bloom diagram 150 in the bloom diagram window 100. Also, the resource diagram tool 30 displays a number of verses in the Bible passage window 92 starting with a verse that appears a number of verses before the subject verse in the context of the Bible up through an ending verse that appears a number of verses after the subject verse. For example, when the panes are configured to show 11 verses, the five verses immediately before the subject verse are shown, followed by the subject verse, which is then followed by five verses immediately after the subject verse.

Figure 11:
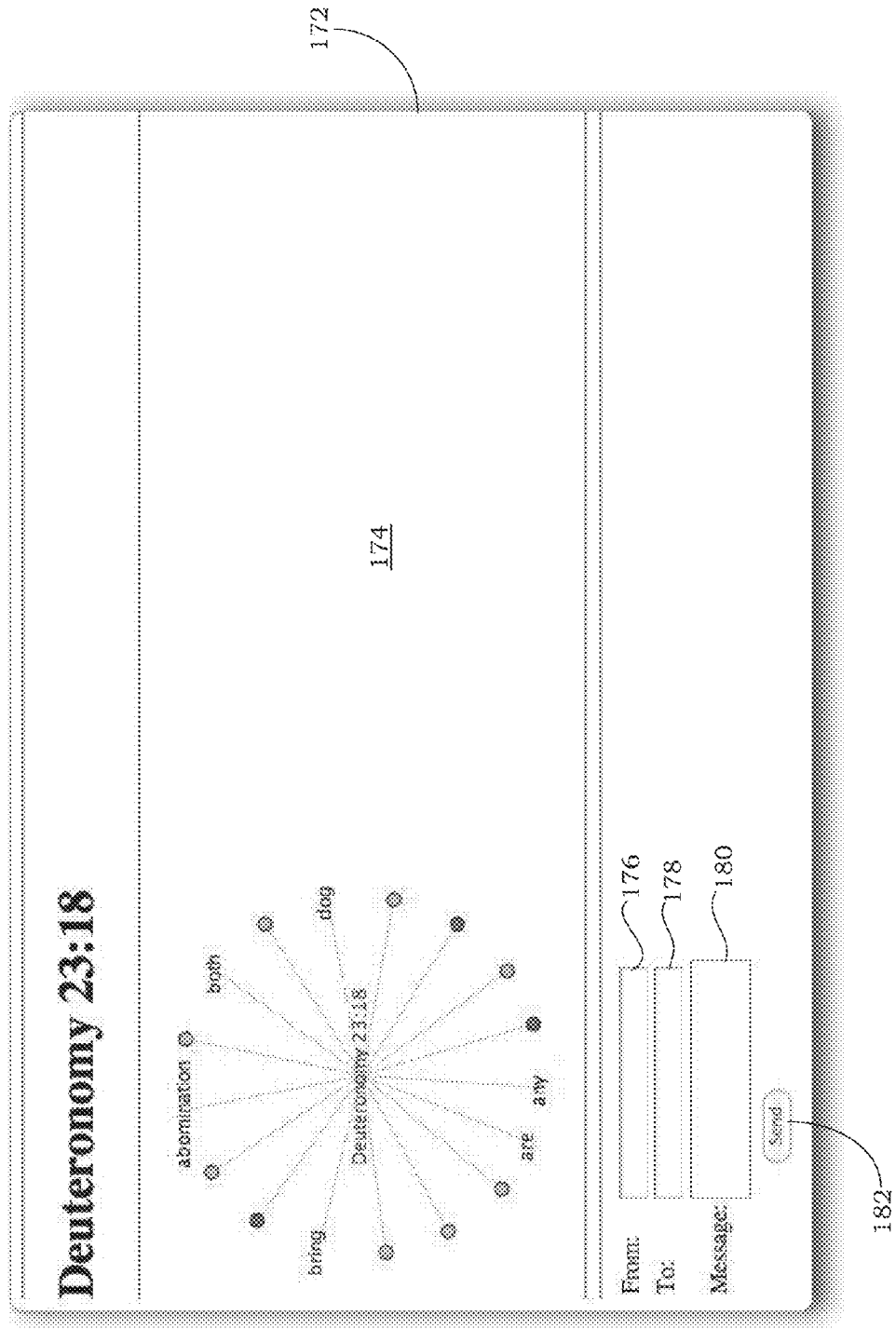

As illustrated in FIG. 11, when the user clicks the share button 120 (FIG. 7), a new window 172 is displayed. The user may then copy information into a message window 174 to share with other. In the example of FIG. 11, a bloom diagram centered around the verse Deuteronomy 23:18 is copied in window 174. To copy, the user may drag and drop any bloom diagrams, any verses in the Bible panes 94, 96, 98, any items in the cross-reference pane 104, elements from the definition pane 106, elements from the thoughts pane 108, or other resource elements. Also, the content of any items taken from a bloom diagram or the entire bloom diagram may be copied and pasted in message window 174. The user may enter information into the "from" field 176, "to" field 178, and any messages into the message box 180. When ready to send, the user may click on the send button 182 and the web site management module 32 forwards the study information to the recipient indicated in the "to" field 178.

In addition, the user may copy and paste resource elements to an open document in a word processor or editor. Copied items are automatically pasted with the entire information of the items. A copied verse looks just as it does in the Bible panes. In some embodiments, items from the bloom diagram may be pasted with the full text of the "pop up" information, which is the information that becomes visible when the user hovers over an item.

Figure 12:
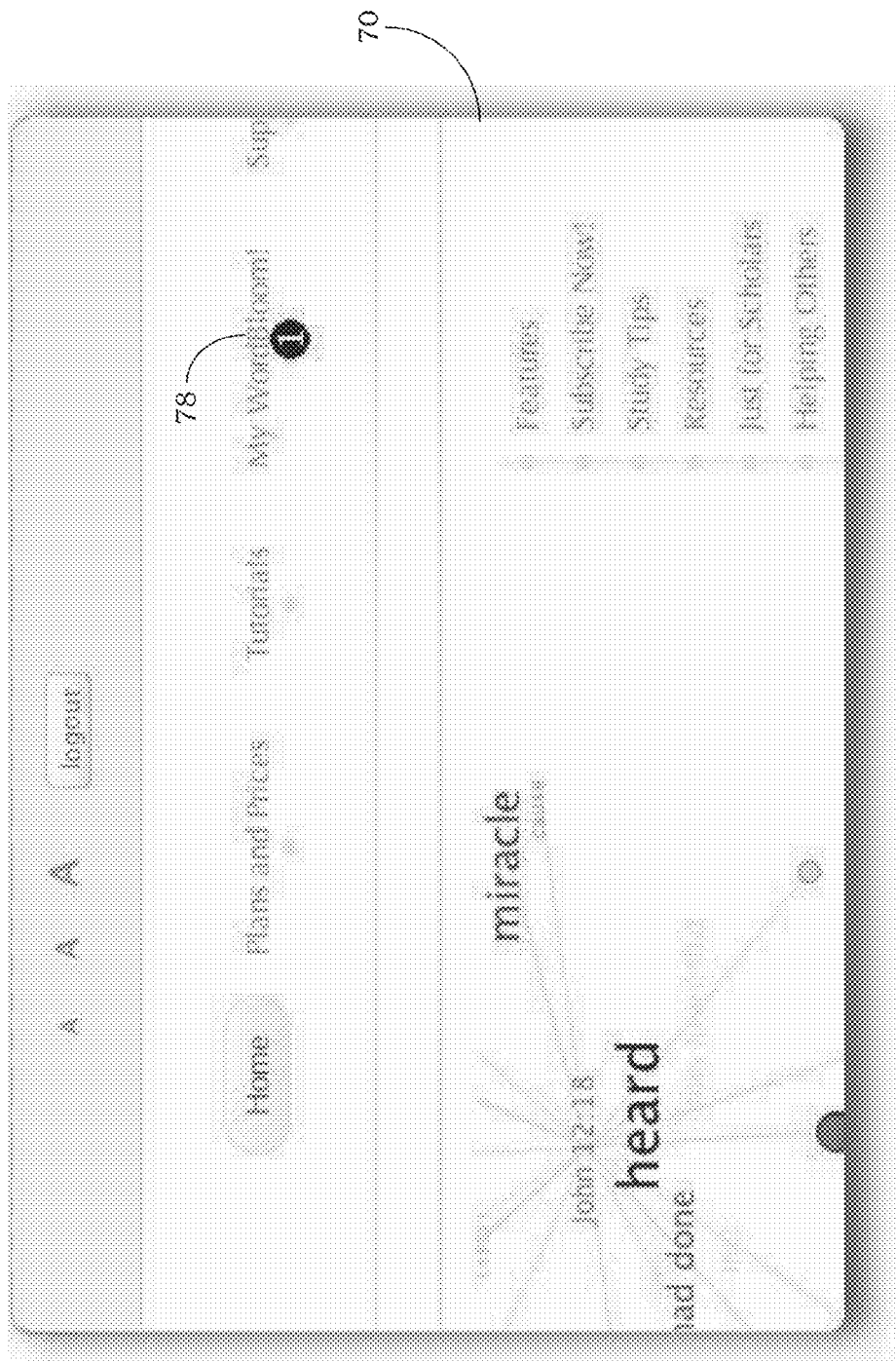

FIG. 12 shows the GUI 70 in which an example of a selection of the My WordBloom! link 78 is illustrated. When the user clicks on the My WordBloom! link 78 on the top of the main menu page (e.g., home page of the resource diagram web site), a Study List web page may be opened.

Figure 13:
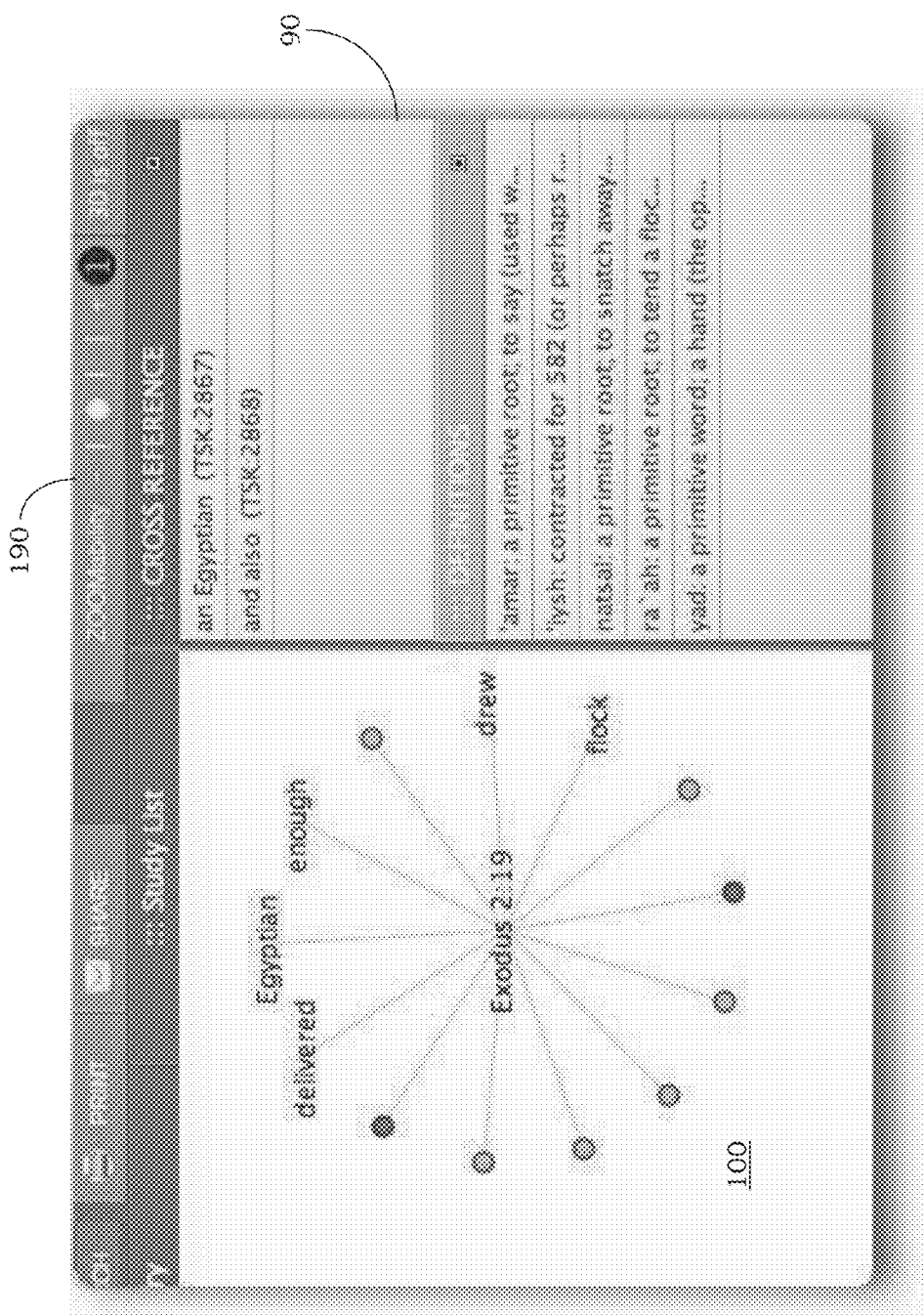

FIG. 13 shows the GUI 90 according to various implementations. Particularly, the GUI 90 of FIG. 13 shows a "ZOOMability" ribbon 190. This feature allows the user to select how many hits are received in response to search inquiries or selection of new subject focus elements. The ZOOMability feature gives the user any number (e.g., four) pre-set formats that define the amount of information that is presented in the various window and panes. According to some embodiments, the pre-set ZOOM levels may include a first level, second level, third level, and fourth level. The four respective ZOOM levels define the number of Bible verses to be displayed as 5, 15, 40, and ALL. The four respective ZOOM levels define the number of cross-reference items to be displayed as 5, 10, ALL, and ALL. The four respective ZOOM levels define the number of definitions to be displayed as NONE, 10, 20, and ALL. And lastly, the four respective ZOOM levels define the number of thoughts to be displayed as RYRIE only, ALL, ALL, ALL. In some embodiments, other formats for selecting the number of elements in the different panes may be used.

Figure 14:
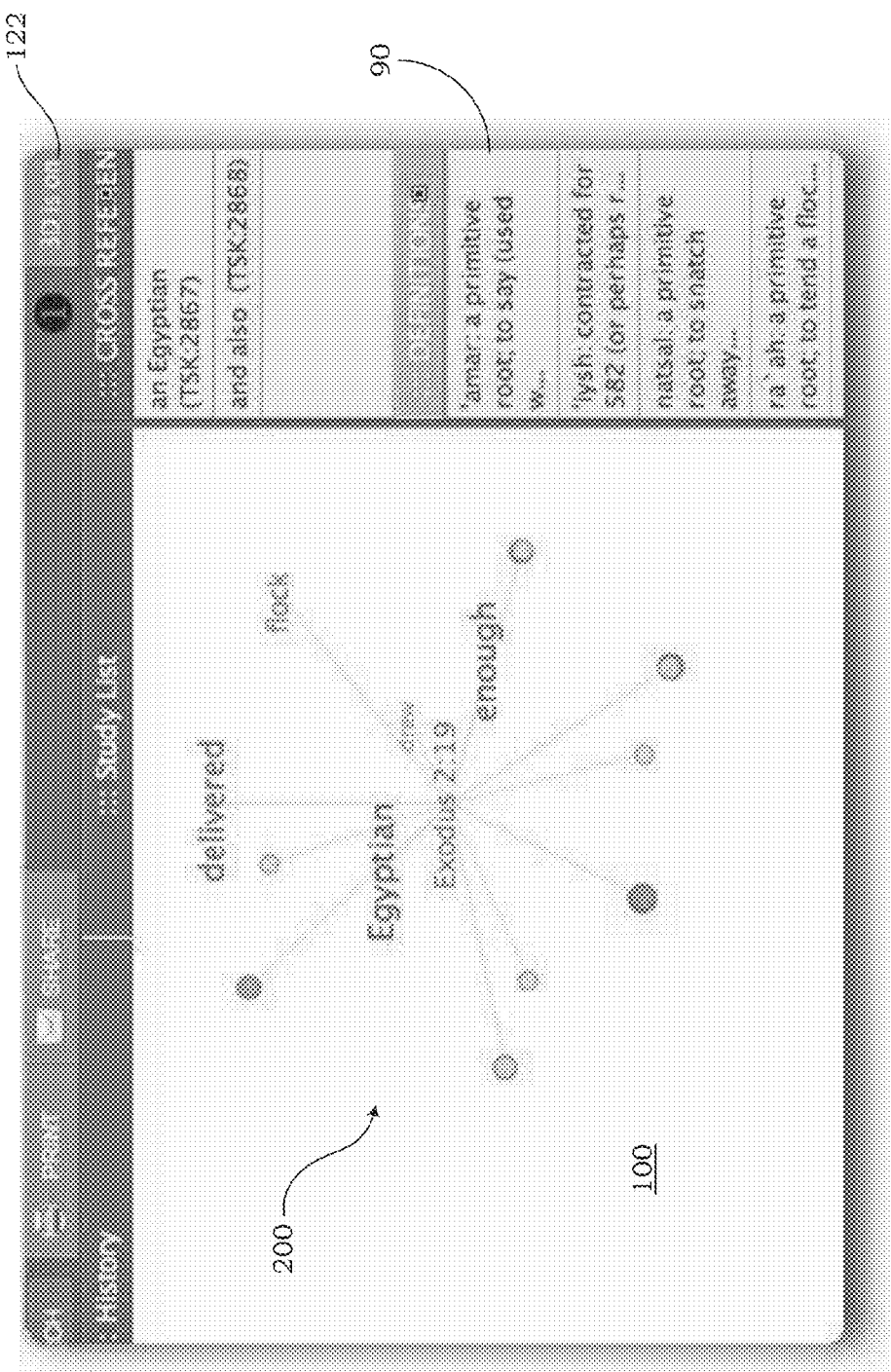

FIG. 14 shows the GUI 90 when the 3D mode button 122 has been pressed to turn the 3D mode on. When the 3D mode is selected, the resource diagram tool 30 changes the two-dimensional bloom diagram 150 into a three-dimensional bloom diagram 200. The graphic of the three-dimensional bloom diagram 200 may help the user focus on one portion of the figure. By clicking and dragging a mouse across the graphic, the user may be able to spin the figure in different direction. The elements of the three-dimensional bloom diagram 200 that are rendered to appear closer are highlighted and the elements that are rendered to appear farther away are diminished, thereby creating the 3D effect.

Figure 15:
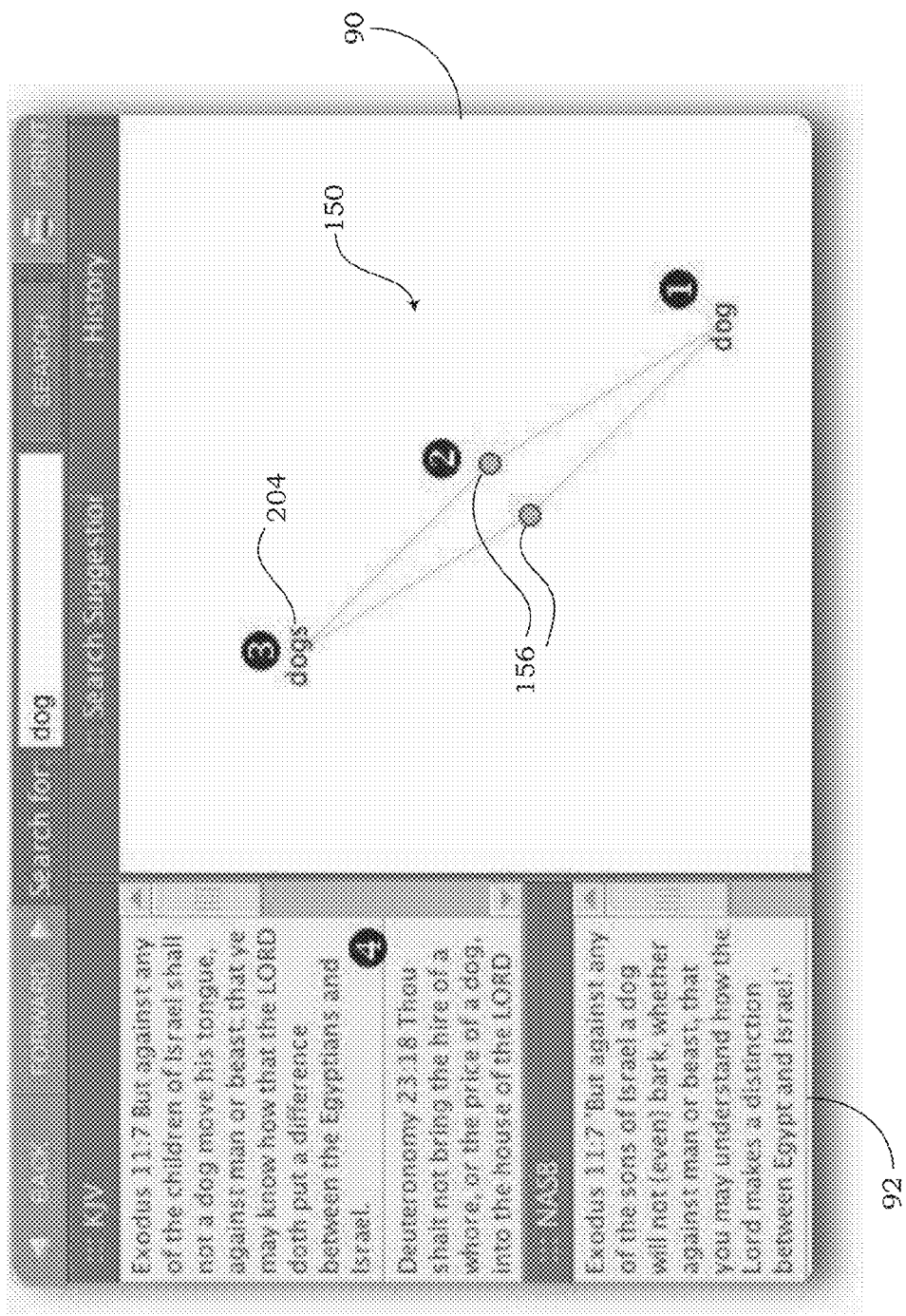

FIG. 15 shows the GUI 90 for illustrating the interactive nature of the resource diagram tool 30. Many of the areas and items in the GUI 90 are interactive. Whenever a user clicks on any one of these interactive items, the resource diagram tool 30 automatically updates to make the selected item the new subject focus element. The updating process is repeated each time a new word or verse becomes the new focus.

The dots 156 of the bloom diagram 150 form a first ring around the subject focus element (e.g., "dog"). Since, for example, the term dog is a word (and not a topic), the first ring of dots 156 may represent definitions or thoughts. If the subject focus element is a verse, the dots 156 may represent words, dictionary definitions, thoughts, or cross-reference items. According to this example, the dots 156 provide reference to the dictionary definitions for "dog." A next level 204 branches off from the first ring of dots 62. This next level 204 may include synonyms (other words used elsewhere in the Bible for the same definition).

The Bible verses are presented in one of two ways based on the subject focus element of the study. When the subject focus element is a word, dictionary entry, thought, or cross-reference item, the Bible passage window 92 displays the verses in which the subject focus element occurs. When the subject focus element is a Scripture Verse, the Bible passage window 92 displays that verse plus ten verses before and after it.

Figure 16:
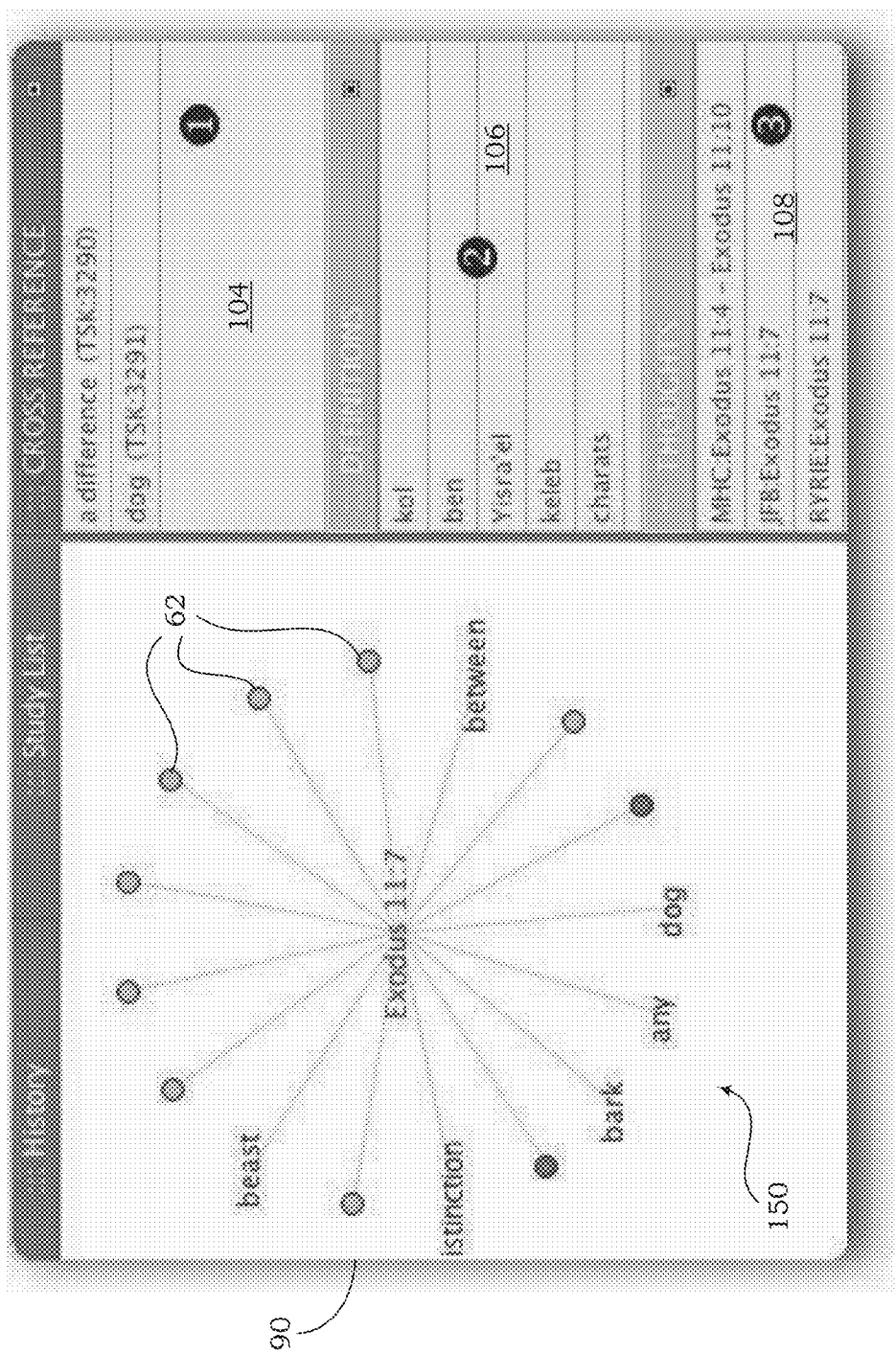

FIG. 16 emphasizes aspects of the cross-reference pane 104, definitions pane 106, and thoughts pane 108. The resource diagram tool 30 automatically presents items related to the user's subject focus element and updates the resource items with every change of focus. Related topics are initially presented in short form in the cross-reference pane 104 and can be selected (e.g., clicked) for more detail. When selected, the cross-reference item is moved to the center of the bloom diagram 150 and becomes the subject focus element. Cross-reference items may include different categories of resource elements, such as verses, topics that related directly to the subject focus element, and topics related indirectly to the subject focus element.

The definitions pane 106 may include dictionary entries or definitions that are indirectly related to the subject focus element. When a word is centered in the bloom diagram, the resource diagram tool 30 translates that word back into its original language and provides relevant definitions. When a dictionary entry is in the center, the full definition may be displayed. The thoughts pane 108 may include any combination of relevant commentaries, notes, and thoughts from respected authors, teachers, or scholars.

Figure 17:
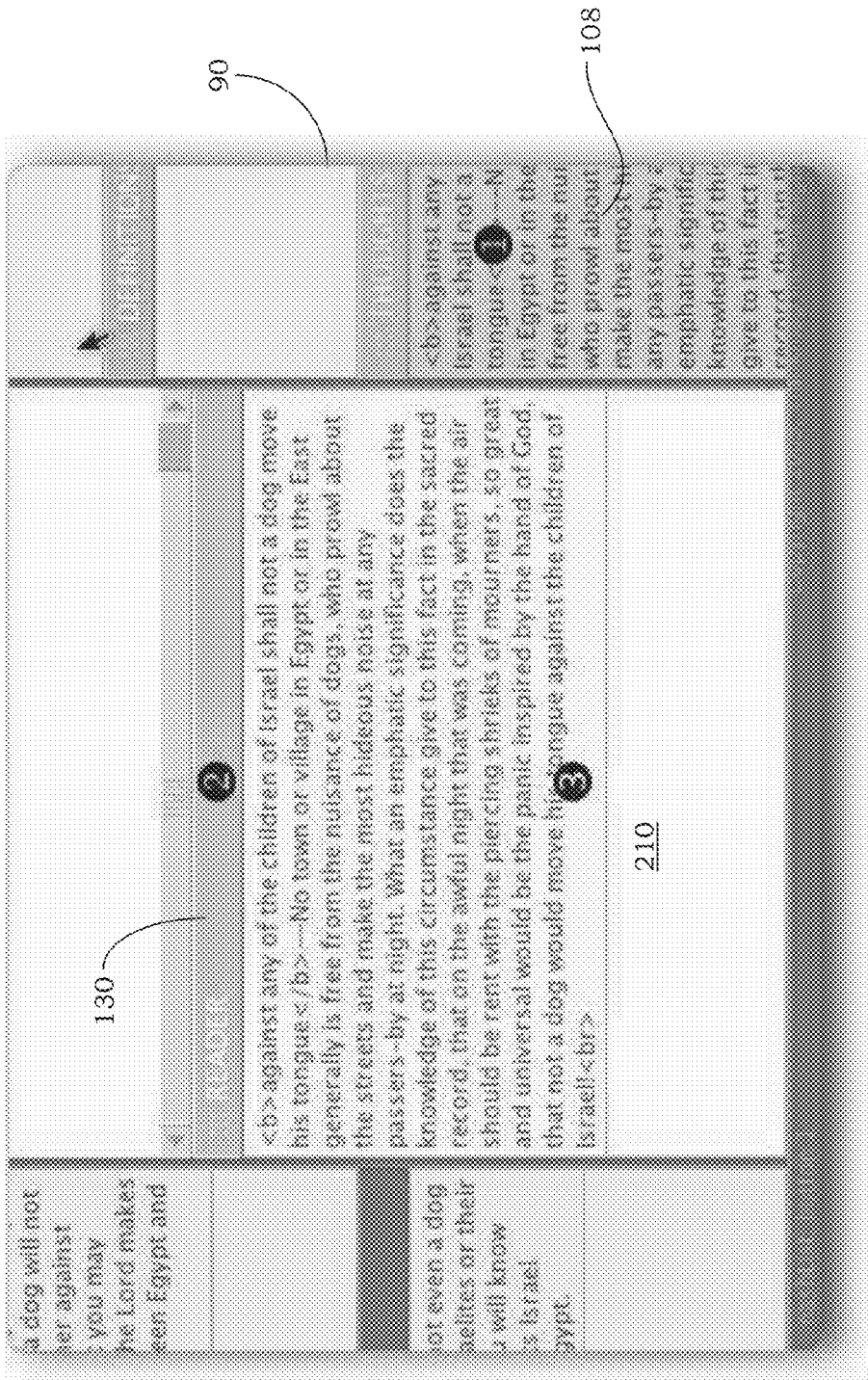

As illustrated in FIG. 17, when an item listed in the thoughts pane 108 is selected (e.g., clicked), the text related to the item may be displayed in a reader window 210. A portion of the text may be shown in the thoughts pane 108, but typically this area may not be large enough to adequately display the text. The reader window 210 may be opened automatically when thought items are selected since they often have more text than the other resource items (i.e., dictionary definitions and cross-references). The reading window 210 may be hidden, expanded, or contracted by dragging the reader pull-up button 130 to a desired size to make the text easier to read.

Figure 18:
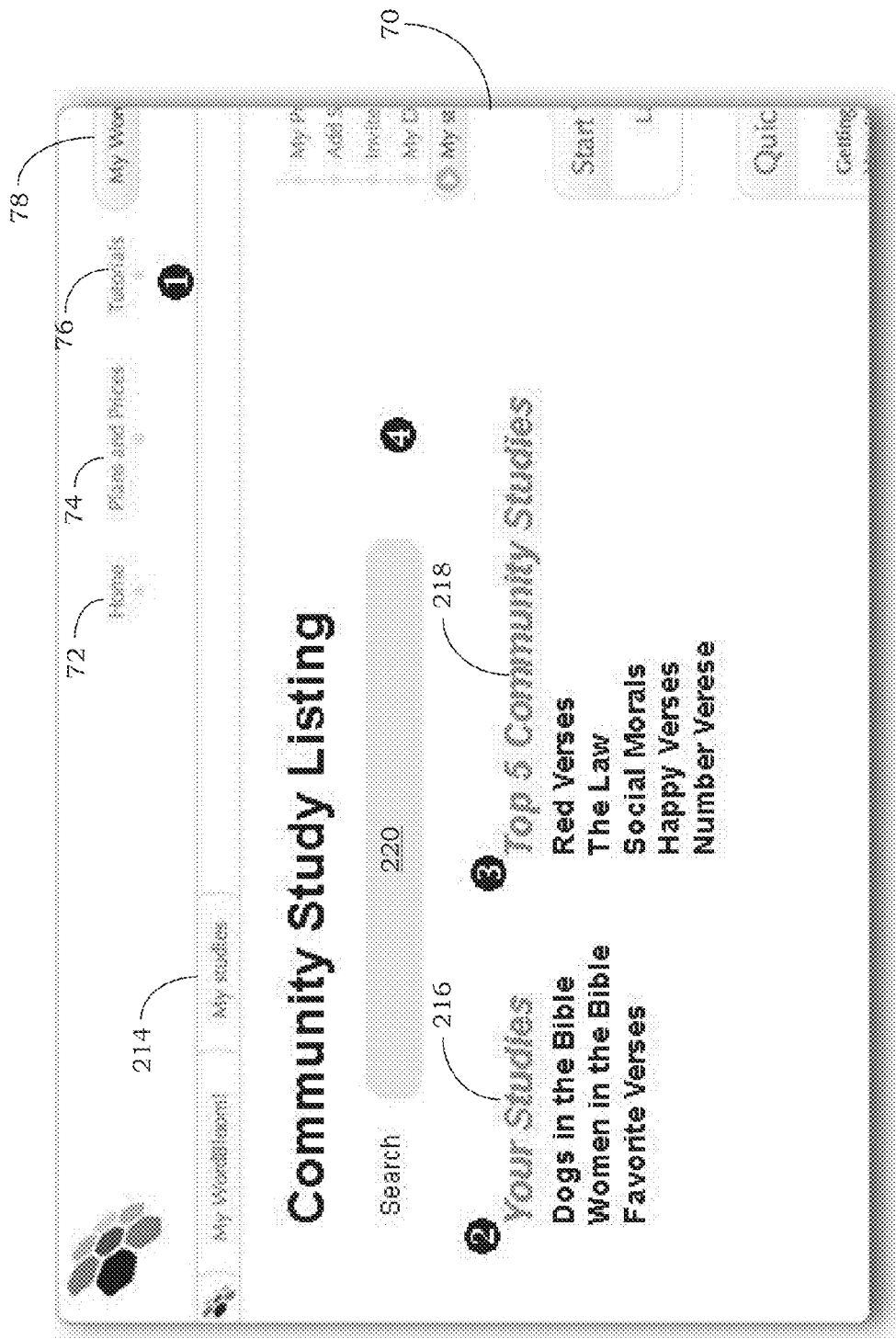

FIG. 18 shows the GUI 70 of the main web page of the resource diagram web site. The resource diagram tool 30 provides many resources plus an opportunity to interact with other members. When teamed with other subscribers of the community, users may receive accountability from others who may also be seeking a deeper understanding of the Bible and a deeper relationship with God. One of the Web resources includes tutorials, which is accessible by selecting the tutorials link 76. As shown in the other links 82 in FIG. 5, other Web resources may include Bible study tips, interaction by joining the community, support, etc.

In some embodiments, a user's manual may be available to members. However, in order to minimize printing costs, the resource diagram tool 30 is configured to provide tutorials that may take the place of paper manuals. Video and Web page Tutorials are configured to walk the user through the various aspects of using the resource diagram tool 30. These tutorials can be found by selecting the Tutorial link 76 from the resource image web site.

Great mentors and teachers may provide some of the best resources to gain a greater understanding of the Bible and find a deeper relationship with God. The resource diagram tool 30 may provide helpful study tips suggested by these great mentors and teachers that can be accessed by selecting a Study Tips link. Guides for Bible study from some highly qualified and respected teachers may be available. Some of these guides may have been provided by scholars and mentors from long ago, even from centuries ago, while others may have been provided by contemporary teachers.

Bible Study Tips and Guides can be found in three separate parts of the web site. For example, a front page article may be posted on a publicly accessible portion of the home page once a week that provides tips and guides for Bible Study. This article can be shared by e-mail or printed. Also, by clicking "Features" or "My WordBloom!" on the main page, more tips and study guides may be accessed. The link may take the user to other web pages that may further comprise additional links to additional pages. Furthermore, tips and guides may be provided to the user via a newsletter sent to the user's e-mail address. For example, the newsletter may be transmitted on a monthly basis and may contain study ideas, ministry applications, small group guides, and other useful information.

Membership also allows the subscribers to receive a Word of the Day, which may be a lighthearted and fun approach to understanding the Bible. The Word of the Day may be a short paragraph and/or picture that is transmitted to the user's e-mail address and/or viewable from the home page and may be provided every day. Make sure that your Word of the Day emails aren't getting stuck in your Spam folder. A user may unsubscribe to the Word of the Day at any time by changing his or her Personal Profile located on the My WordBloom! web page. There is also an "Invite Friends" link on the "My WordBloom!" page that allows a user to invite friends or family members.

Reference is made again to FIG. 18. When a member logs in, new menu items may appear on the web page. For example, the user may have access to "My Studies" that includes a list of the saved studies for the user. By clicking on a My Studies link 214, a listing is opened that may include two categories: a Your Studies listing 216 and a Public Studies listing 218. In addition, the user may search through many Community Studies using Search Box 220. If the user select the study under the Public Studies listing 218 entitled "The Law," for example, the resource diagram tool 30 displays the information as shown in FIG. 19 within the GUI 70.

Figure 19:
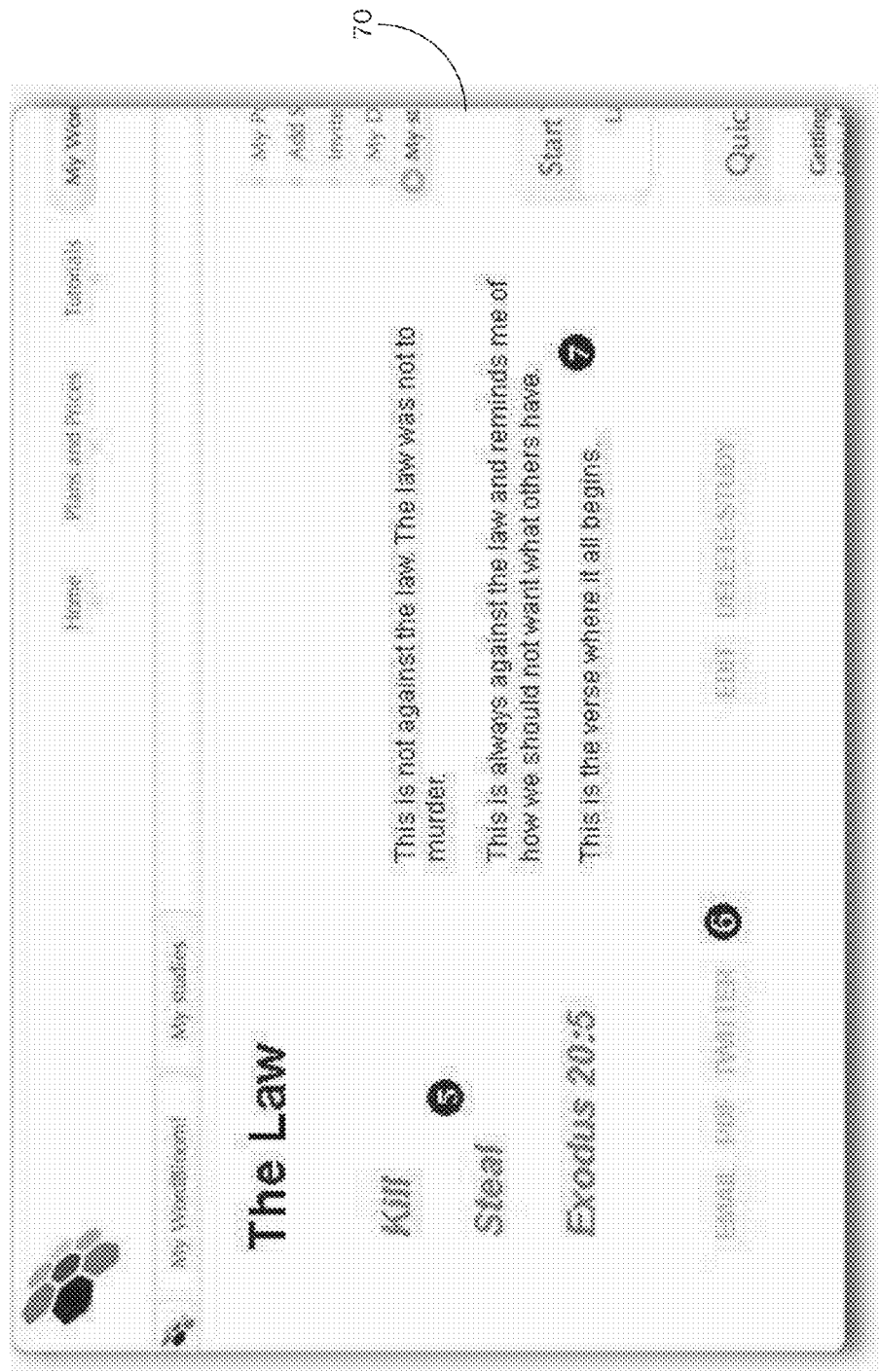

In FIG. 19, the specific study saved as "The Law" includes information saved by members of the community, who may be students, teachers, et al. The user may wish to print, e-mail, and/or share studies with their social networks. Also, the user may wish to add and/or edit comments for any item in any of the Your Studies, and in some embodiments may add and/or edit comments in the Communities Studies.

Figure 20:
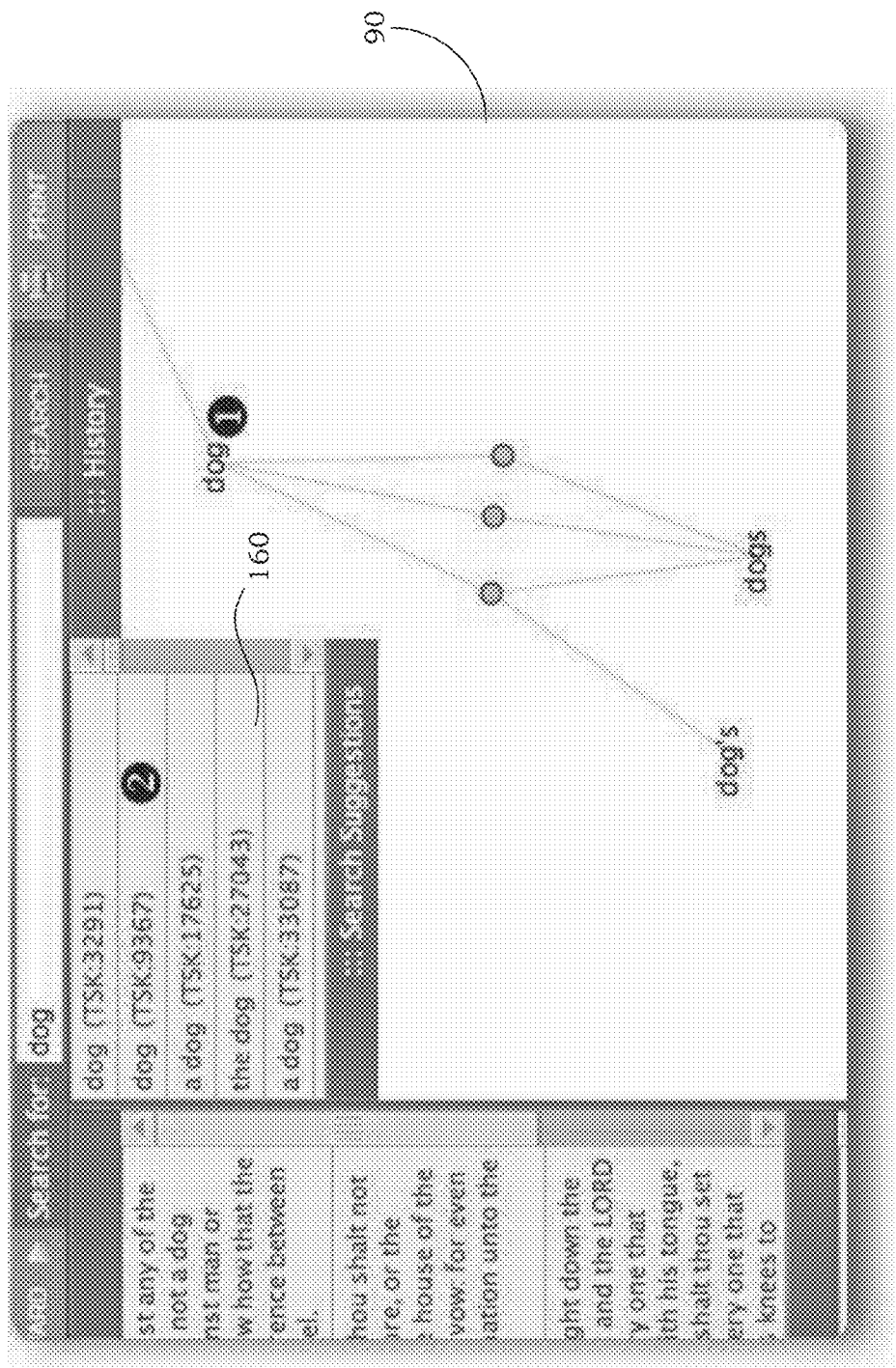

With respect to FIG. 20, the resource diagram tool 30 may also provide an overview tutorial for people who may already have experience with other Bible study software or other similar resources. A goal is to help these users get the most out of the resource diagram tool 30 by revealing its focus and primary features. An important purpose of the resource diagram tool 30 is to help people gain a better understanding of the Bible with the hope that a greater understanding will result in a deeper relationship with God. With that focus in mind, experienced Bible Study software users will be exposed to a different approach to Bible Study software.

Typically, one obstacle to the study of the Bible is a lack of time. However, since a search for the Truth is such a great need for all people, the resource diagram tool 30 is configured to provide a depth of useful information on one page. With such a resource available, the user may be able to easily study the Bible with regularity, even in a deeply insightful way, which may hopefully lead to a deeper walk with God.

Until now, many Bible software program may include many tabs, pages, links, etc., which may be difficult to learn. According to internal market research, it has been discovered that most people do not have a confident understanding of the Bible, much less selecting a Bible Study materials and/or resources. The resource diagram tool 30 is designed to reach out to busy people with opportunities for daily interaction with others and daily access to the Bible. The resource diagram tool 30 allows access to small groups within a church, Sunday School programs, or even study groups with people having similar interests anywhere in the world.

Not only is the resource diagram tool 30 a tool for extensive study, but it also may be an excellent resource to reach out to people who may need encouragement to study, interact with others, and learn in a way that is intuitive to them. The resource diagram tool 30 provides an architecture that is designed to match the way that people think and live. In this way, the resource diagram tool 30 may be one of many tools for ministering to the needs of people.

The resource diagram tool 30 is designed to deliver a great amount of relevant information in a short amount of time and deliver this information in a way that is enjoyable and engaging. Although the subject of Bible study may be challenging, it may be important to present the challenging aspects of the Word of God in a visual manner that may be easier to comprehend for many people. With the great amount of information presented on one page, the user may be able to be exposed to the Bible in a meaningful way without the hard work that usually comes with in-depth study. With the resource diagram tool 30, a user may receive great truths about the Bible without the need to sort through numerous web pages or software tabs and without trying to figure out which resource to search next. The resource diagram tool 30 not only automates those processes but also leverages the user's ability to easily learn in a visual manner.

The user may customize how many of the resources are presented. By using the ZOOMability feature, the user may receive only the amount that is comfortable at the time. The ZOOMability feature provides four quick settings taking the user from a few resources to all of the resources provided in the resource diagram tool 30. This allows the user to search for words, topics, and verses and receive immediate results without the need to wade through too many resources.

The resource diagram tool 30 is also configured to target an audience of those who already know how to use many classic resources that are included in the program. One goal of this software is to show new ways that the resource diagram tool 30 uses these classic resources. A primer, which provides an overview tutorial for the experienced user, may illustrate new ways to use the tools in the resource diagram tool 30.

The resource diagram tool 30 further comprises a feature referred to herein as a Treasury of Scripture Knowledge (TSK), which includes cross-references between topics and Bible verses. The topic may be searched to allow the user to see the originating and related TSK verses for a search topic. The TSK data and updated TSK data may be stored on the database 34 and accessed by the resource diagram tool 30 for providing cross-references. If the user searches for a verse using the search field 114 or by selecting a verse to be a new subject focus element, the verse is run through TSK to find any related TSK topics. These topics may appear in the search suggestion window 160 as well as in the cross-reference pane 104. When a word is the subject focus element, the resource diagram tool 30 searches through the TSK topic data for related topics.

Figure 21:
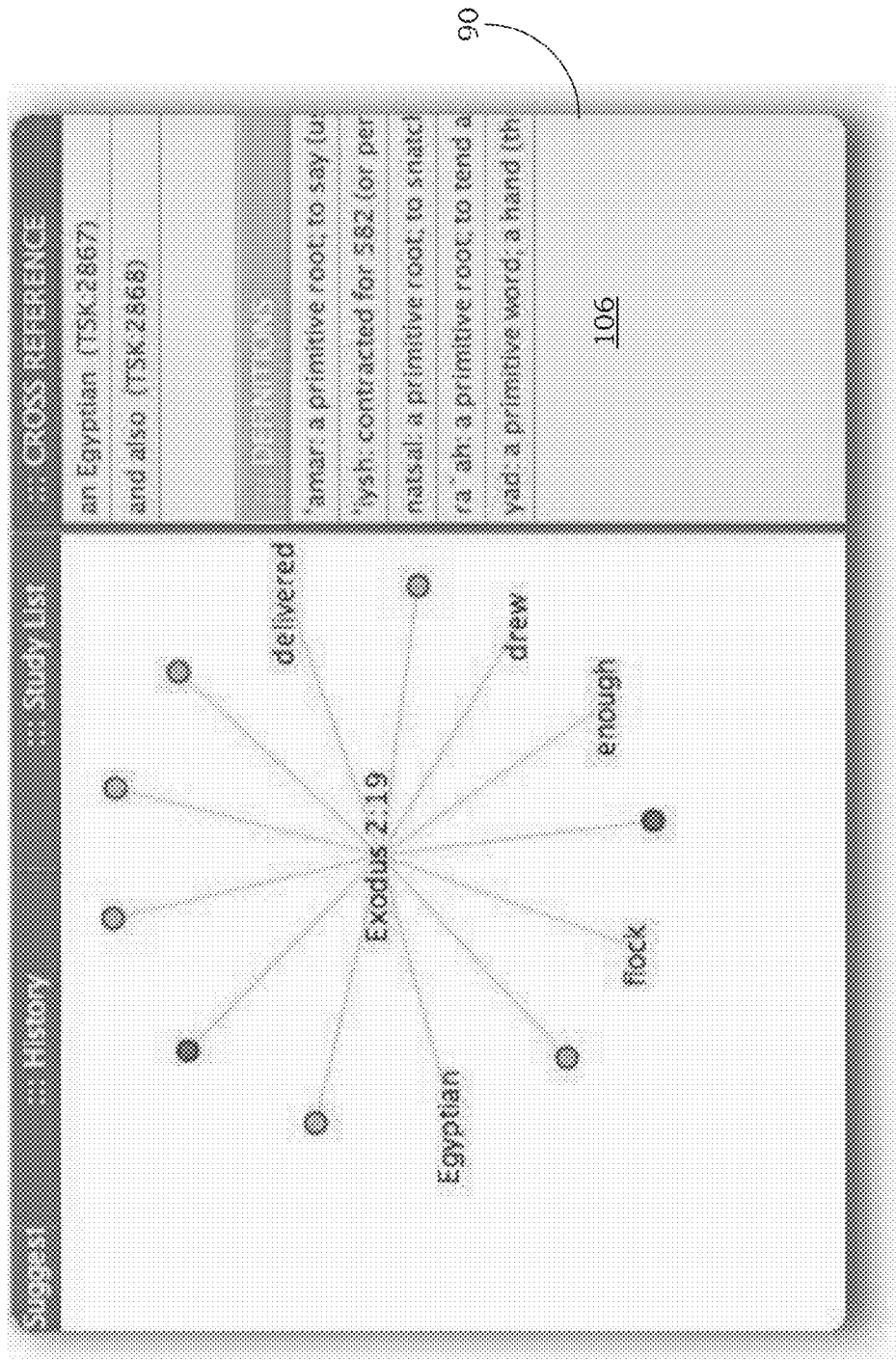

Referring now to FIG. 21, an explanation of interlinear resources is given. Interlinear resources are provided for every Bible verse in every available version of the Bible. The resource diagram tool 30 automatically displays the English and Greek words for every verse that is selected and within every version. This provides a way to see these resources without the need to open multiple panes. When a verse is the subject focus element of the bloom diagram (e.g., "Exodus 2:19"), the original language words and the transliteration are displayed. A user may then select a word (e.g., "flock") and that word becomes the new subject focus element. From the flock centered bloom diagram, the user may then select the word "herds" as the subject focus element. The English word "herds" is translated from an original language word "tso'n." If the user selects tso'n, this word becomes the new subject focus element having the English words translated from the original word surrounding the center word tso'n.

Figure 22:
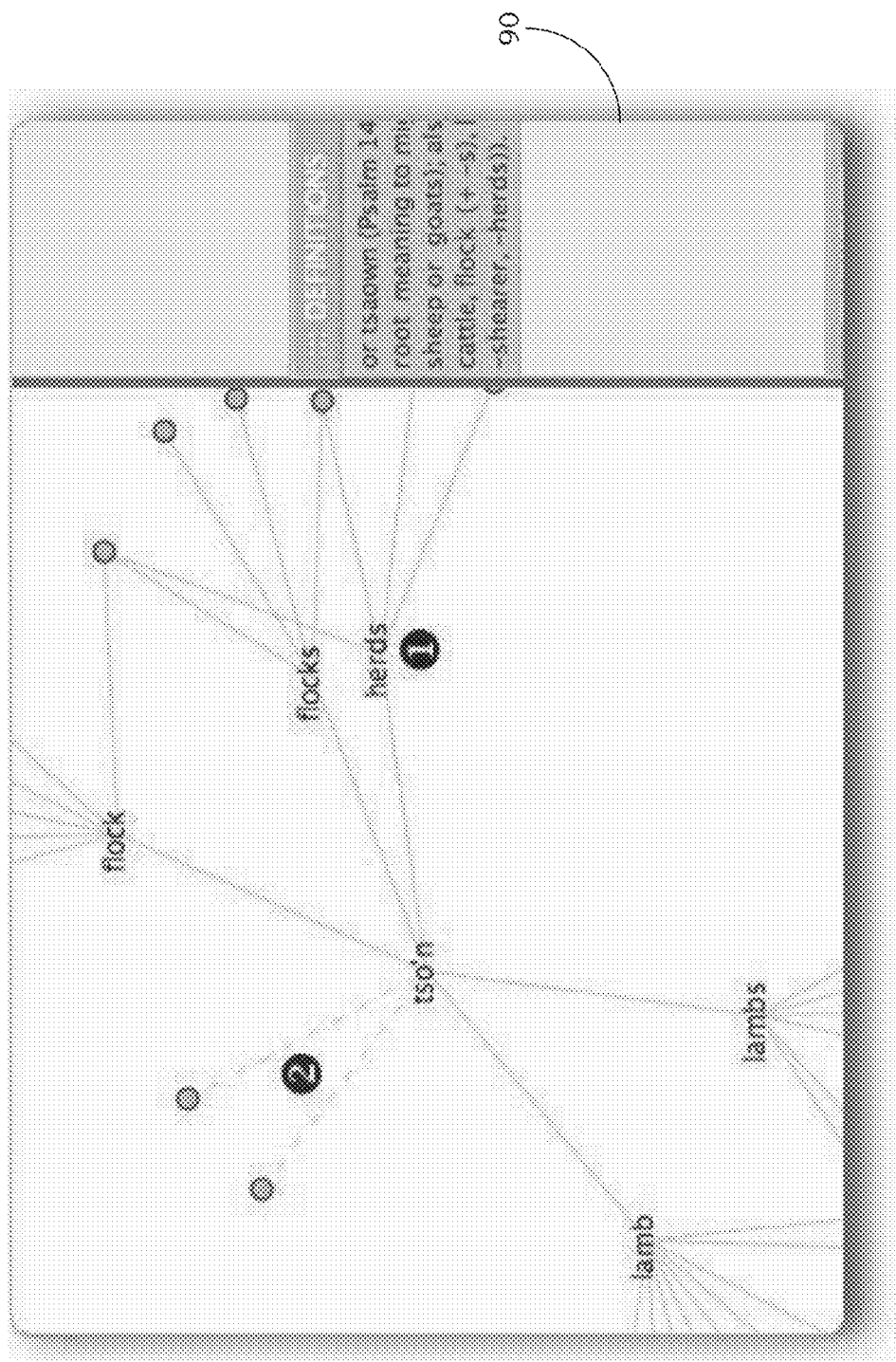

FIG. 22 shows the example of the selection of tso'n as the subject focus element. The resource diagram tool 30 provides Biblical thesaurus technology which provides a quick visual representation of the English words that may describe one Hebrew or Greek word. A Greek or Hebrew word can be entered in the search field using the transliterations of the languages, allowing entry of Greek and Hebrew words by their transliterated, or simple English equivalent, form. For example, the user may enter the Greek Word "agape" in the search field.

James Strong's Exhaustive Concordance and Dictionary has been at the heart of many word study tools since 1890. Strong defined every word in the Bible and made a catalogue of every place where these words occur in the Bible. For decades, resources have used these Strong's numbers to define, cross reference, and identify Hebrew and Greek words in many Bible dictionaries, classroom studies, commentaries, or other reference resources. A user may enter a Strong's Number into the search field using the format "OT+[Strong's Number]" for Old Testament searches or "NT+[Strong's Number]" for New Testament searches. Therefore, the architecture of the resource diagram tool 30 may be configured to leverage existing resources and technologies to engage the user with interactive, visual representations.

The resource diagram tool 30 may be configured to apply a dynamic, data driven technology, such as Thinkmap® from ThinkMap, Inc. This technology is designed to help the user visualize complex data. According to the implementation of the present disclosure, this technology may be used to represent complex Biblical resources and the related links between the resources to help users visualize many resources simultaneously while also seeing connections between the ideas and thoughts about the Bible and related reference materials. In other embodiments, the resource diagram tool 30 may utilize other visual tools for presenting complex material of a classic literary work and related resources in a fashion that is easy for a user to see and conceptualize.

In some embodiments, the resource diagram tool 30 may include applets. An applet is any small software application that performs one specific task, sometimes running within the context a larger program. Some applets are able to function as any other normal software application (provided they are hosted by an operating system). However, they are small in size and perform only a small set of tasks. In many cases, an applet does not run independently, but run in a container, which is provided by a host program, through a plug-in, or a variety of other applications including mobile devices that support the applet programming model. A larger application may be configured to distinguish its applets from its subroutines. For instance, an applet usually executes only on the "client" platform environment of a system, as contrasted from a "servlet." As such, an applet provides functionality or performance beyond the default capabilities of its container (e.g., browser). Also, applet capabilities are restricted by the container. Furthermore, applets are typically written in a language different from the scripting or HTML language which invokes it. The applet is written in a compiled language, while the scripting language of the container is an interpreted language, hence the greater performance or functionality of the applet. Unlike a sub-routine, a complete web component may be implemented as an applet. Java Applets are used to provide interactive features to web applications that cannot be provided by HTML. Since Java's byte-code is platform independent, Java applets can be executed by browsers for many platforms, including Windows, Unix, Mac OS and Linux.

When a Java technology-enabled browser views a page that contains an applet, the applet's code is transferred to the client's system and executed by the browser's Java Virtual Machine (JVM). The resource diagram tool 30 may be an applet that runs both as stand-alone software and as dependent applet software depending on the application. The features that are part of or launch from the resource diagram tool 30 are instructions executed through the foreground applet.

The resource diagram tool 30 may utilize Web 2.0 Standards to provide interactive Bible displays without tabs, pop-ups, and new pages. Application content is updated automatically based on the user's actions and context, thus automating the retrieval of complex information quickly. This allows the user to seamlessly and simultaneously see the data items related to the subject focus element.

The resource diagram tool 30 also leverages the power of the World Wide Web, or Internet, allowing users to take their studies across town or even around the world. Groups may share and compare studies and individuals and groups may be provided with daily media content, teaching, tips and information regarding study, texts, tips for using the resource diagram tool 30, which is able to deliver a rich, interactive, and attractive interface for people to study the Bible. Studies can be shared with other using various social networks, such as Twitter™, Facebook™, etc.

The resource diagram tool 30 allows for natural language searches and applies the power of advanced search technologies described herein to provide customizable Bible searching to make it easy and intuitive while retaining the depth of complex searches for scholars.

Bible students often use Strong's Exhaustive Concordance of the Bible for studying the meaning of Hebrew and Greek words. The resource diagram tool 30 is configured to provide classic reverse Hebrew and Greek verse lookup for providing a greater understanding of the meaning of words as well as for doing original language topical studies. Users may be able to get a quick understanding of any word by taking a particular Strong's Number and running it back through the Bible to find other locations and ways that the original word was translated in the Bible. The resource diagram tool 30 provides the Englishman's Search automatically in two ways. A first way is by presenting the original language definitions surrounding a verse as the subject focus element. If this original language definition is selected as the new subject focus element, the resource diagram tool 30 presents the Bible verses that include one or more occurrences of the original language word. When a word is the subject focus element and the original language definitions are presented in the definitions pane 106, the user may click a related definition and the original language word becomes the new subject focus element and the Bible verses that contain that word are presented in the Bible passage window 92.

Strong's Concordance, Vine's Expository Dictionary of New Testament Words, dictionaries, thesauruses, and other Bible word resources may be included in the resource diagram tool 30. These resources may be available for any text search for the words in any version of the Bible. Vine's expositions may be linked to the English and original language words that occur in the Bible. In addition, the resource diagram tool 30 is configured to handle root words and basic etymology. When a Hebrew or Greek definition becomes the subject focus element, a thesaurus may show related English words with related definitions allowing for a second level of language access.

Figure 23:
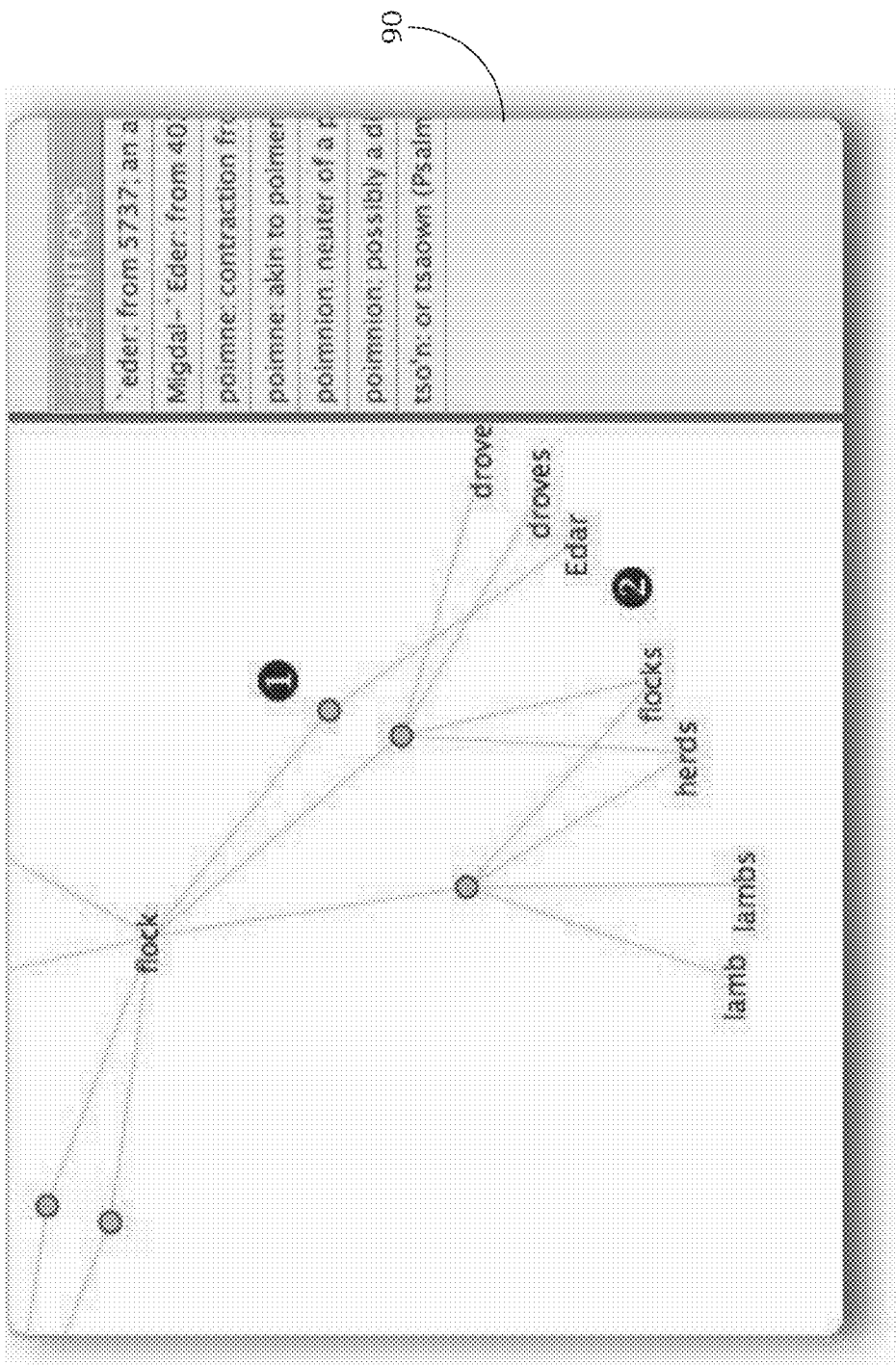

With respect to FIG. 23, an example of a visual tri-lingual Biblical thesaurus is described. The resource diagram tool 30 may automatically present word usage showing links to the word focused through common definitions to the other English words in the current Bible Versions. Root and related words may also be presented and may include Strong's numbers in the bloom diagram linked by a dashed line.

With respect to FIG. 23, translation features of the resource diagram tool 30 are described. The Bible was primarily written in two languages: Hebrew and Greek. Both of these ancient languages are often called "rich" languages because it may take ten modern English words to clearly understand one Hebrew word. In the example, an English word "flock" is surrounded by several dots representing Greek and Hebrew words that appear in the definitions pane 106. These ancient language words have been translated into the word "flock." Words, which are related to the ancient language words, form a second level of English words that are also translated from the respective ancient language words. According to this example, some of these second level words include "lamb," "lambs," "herds," "flocks," "drove," and "droves."

Figure 24:
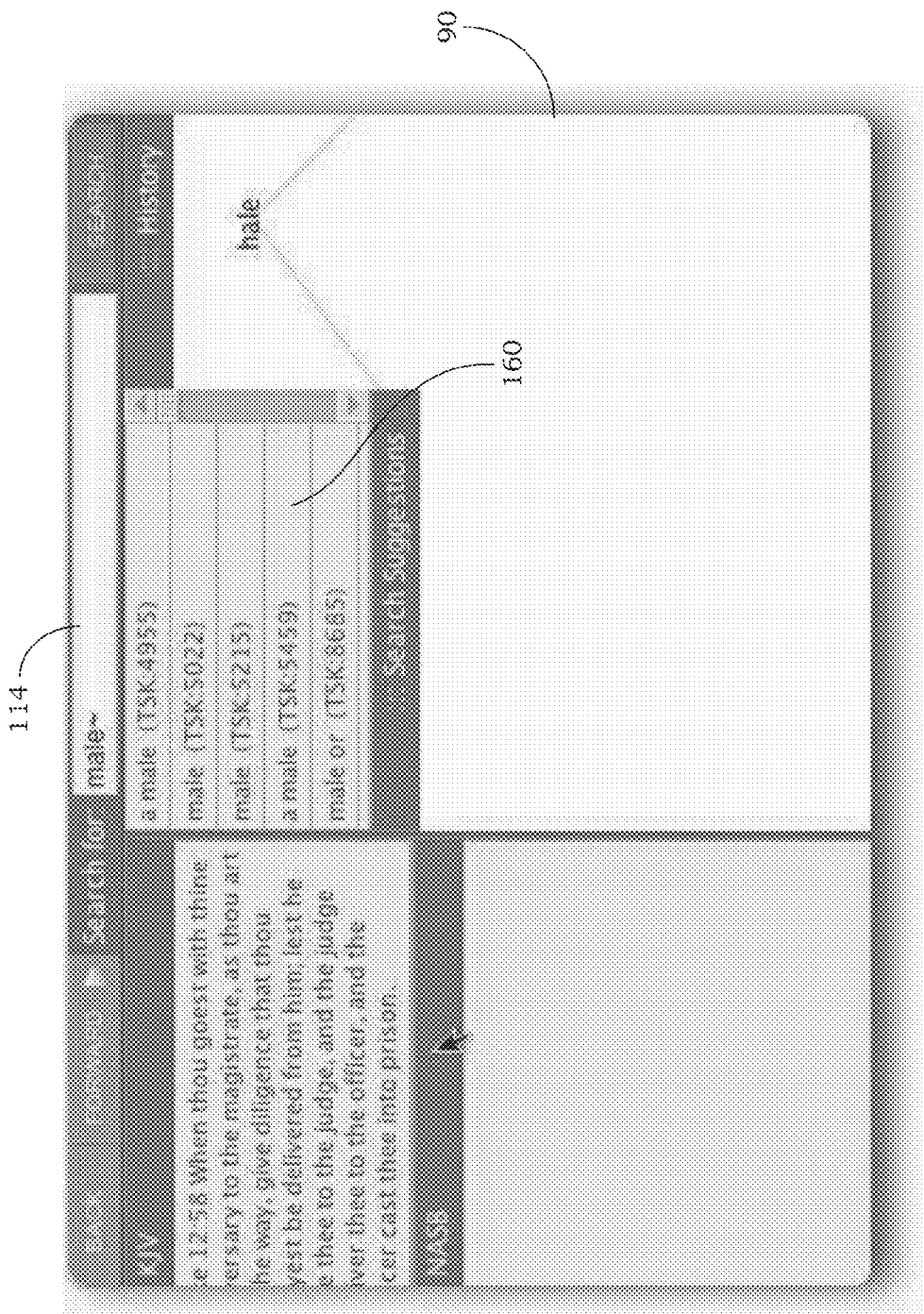
Figure 25:
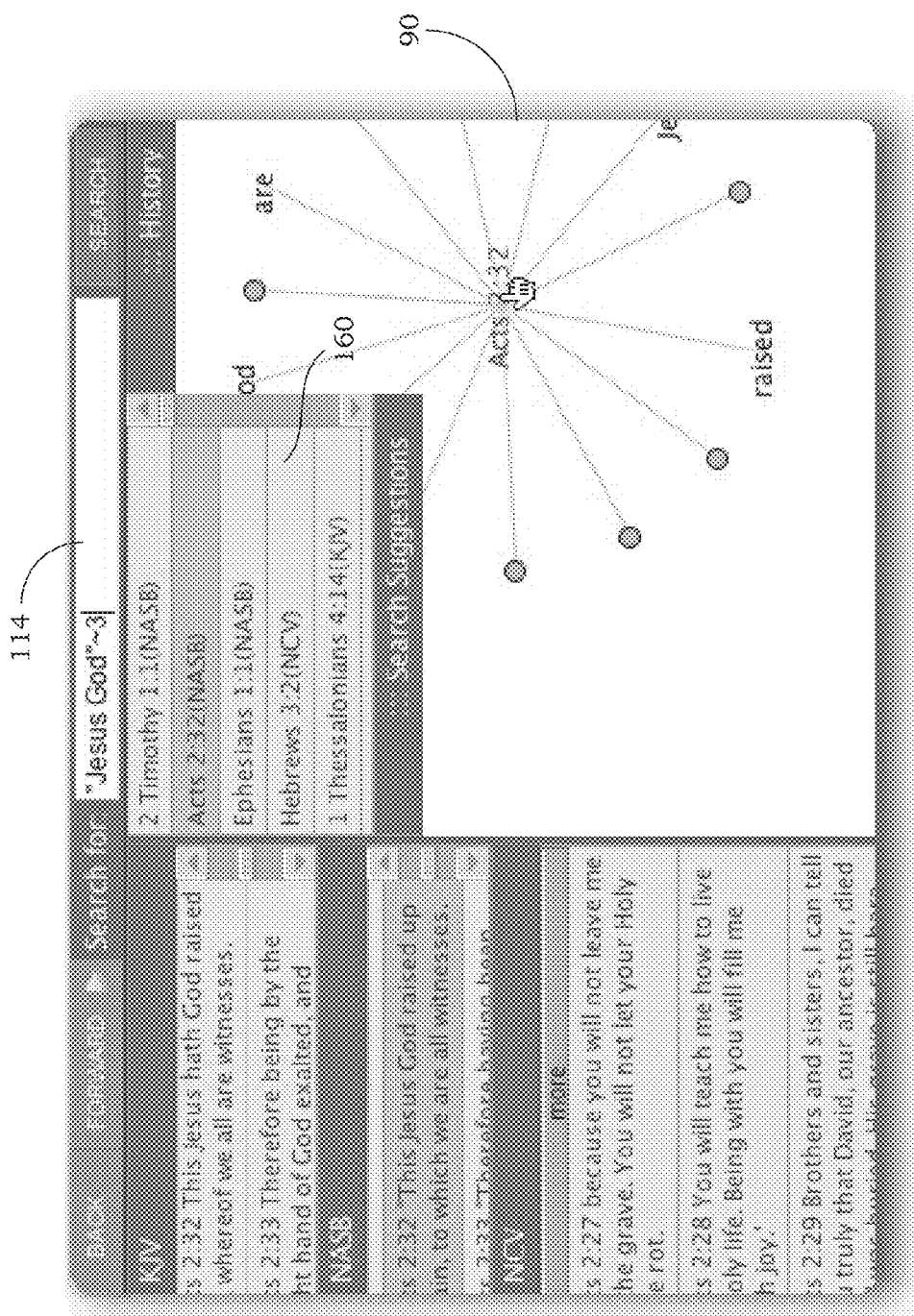

With respect to FIG. 24, examples of different search technologies that may be used by the resource diagram tool 30 are explained. An Intelligent Search Technology is enabled to help users by providing suggestions, ideas, and in some cases linking ideas that a user may have never seen before. The Intelligent Search is based upon Thinkmap® technology that allows the resource diagram tool 30 to find the best matches for a search. Intelligent Search Technology finds these matches using complex algorithms and industry standard technologies. Another technology is Advanced Searching, which may be a powerful tool and may be customized by the user. The Advance Searching Technology may include, for example, testament searching, fuzzy searching, proximity searching, Boolean searching, wildcard searching, BOOST searching, grouping, Greek and Hebrew searching, and other types of searching.

Testament searches may be used to allow the user to narrow a search to either the Old Testament or the New Testament. In order to speed up a user's search, the user may use the testament search to limit the number of search hits if the user knows the testament in which the word appears. In the search field 114, the user may enter ":OT" following a search term to narrow the search to the Old Testament or ":NT" following the search term to narrow the search to the New Testament.

The Fuzzy Search allows the user to look for words that are similar to the search term entered. To request a fuzzy search, the user enters a tilde ("~") after the search term. For example, if the user enters "bath", the resource diagram tool 30 provides suggestions in the search suggestion window 160 that may include words such as "bath," "bathe," "Bathsheba," "Beth," "path," etc. This may be a valuable tool when the user does not know or remember exactly how to spell a particular word. Another example, as illustrated, is a fuzzy search for "male." One suggested provided may be the word "hale."

Proximity searching may also be a powerful tool for searching for multiple terms. An example of a proximity search is explained with respect to FIG. 25. To perform a proximity search, the search terms are placed in quotation marks and a tilde ("~") plus a number follows. The number represents the number of words within which the terms occur in the Bible. For example, the user may wish to search for a verse in Scripture that has the words "God" and "Jesus" within three words of each other. Perhaps the user remembers a verse that read something like "God raised up Jesus . . . " or "God lifted Jesus . . . " The search query "Jesus God"~3 may be entered in the search field 114 in this example. In response, the resource diagram tool 30 automatically provides suggestions in a special order. The search results where "Jesus" is closer to "God" rise to the top of the list while those results where "Jesus" and "God" are farther apart move lower. For example, compare the ranking of Acts 2:32 (NASB) with the ranking of Ephesians 1:1 (NASB) in the search suggestion window 160. The distance between the words "Jesus" and "God" is zero words apart for Acts 2:32 (i.e., "This Jesus God raised up . . . ") whereas the distance is three words apart for Ephesians 1:1 (i.e., "Paul, an apostle of Jesus Christ by the will of God . . . "), where common words "the," "of," etc. are not considered. In addition to relevant verses, the search suggestions may also include relevant commentaries, definitions, etc. that meet the search criteria.

Boolean Searches normally use standard logical terms, such as "AND," "OR," "NOT," etc., which may be placed between the search terms to narrow the results. Also, parentheses and/or quotation marks may also be used in some embodiments. To search for both terms "John" and "love" in the same verse, the user may enter: John AND love. To search for one term (e.g., "sin") without another term (e.g., "death"), the user may enter: sin NOT death. Suppose a user wishes to search for a first term (e.g., "death") that occurs along with either a second term (e.g., "sin") or third term (e.g., "disobedience"). In this case, the user may enter: death AND (sin OR disobedience). The results may include verses such as "the wages of sin is death . . . " and "the price of disobedience is death . . . "

Wildcard Searches allow the user to find extensions of the entered search term. An extension of the search term means that results are found including the search term plus anything. This may be helpful is the user does not know how to spell a term or if the term may have varying characters. Wildcard searches are entered by following the search term with an asterisk ("*"). If the user enters dog*, the search engine of the resource diagram tool 30 searches for words that contained "dog" as the first three characters. The results may include "dog," "dogs," "dogmatizo," "dogma," "dogged," etc. This type of search may be useful when the user wants to see plurals of words and/or various forms of the word. For example, the search "lov*" is configured to provide the results love, loves, loved, loveth, loving, etc. Wildcard Searches may also include varying character within a search term. By using a question mark ("?") in place of one or more variable characters, the search engine is configured to find the terms with any characters where the "?" appears. For example, if the user enters a search for "d?g", the search engine is configured to return the results dog, dig, dug, etc. Also, a search for "d??g" may find the results drag, drug, etc. In some embodiments, "?" may represent a single character, but in other embodiments the symbol "?" may represent any number of characters.

Figure 26:
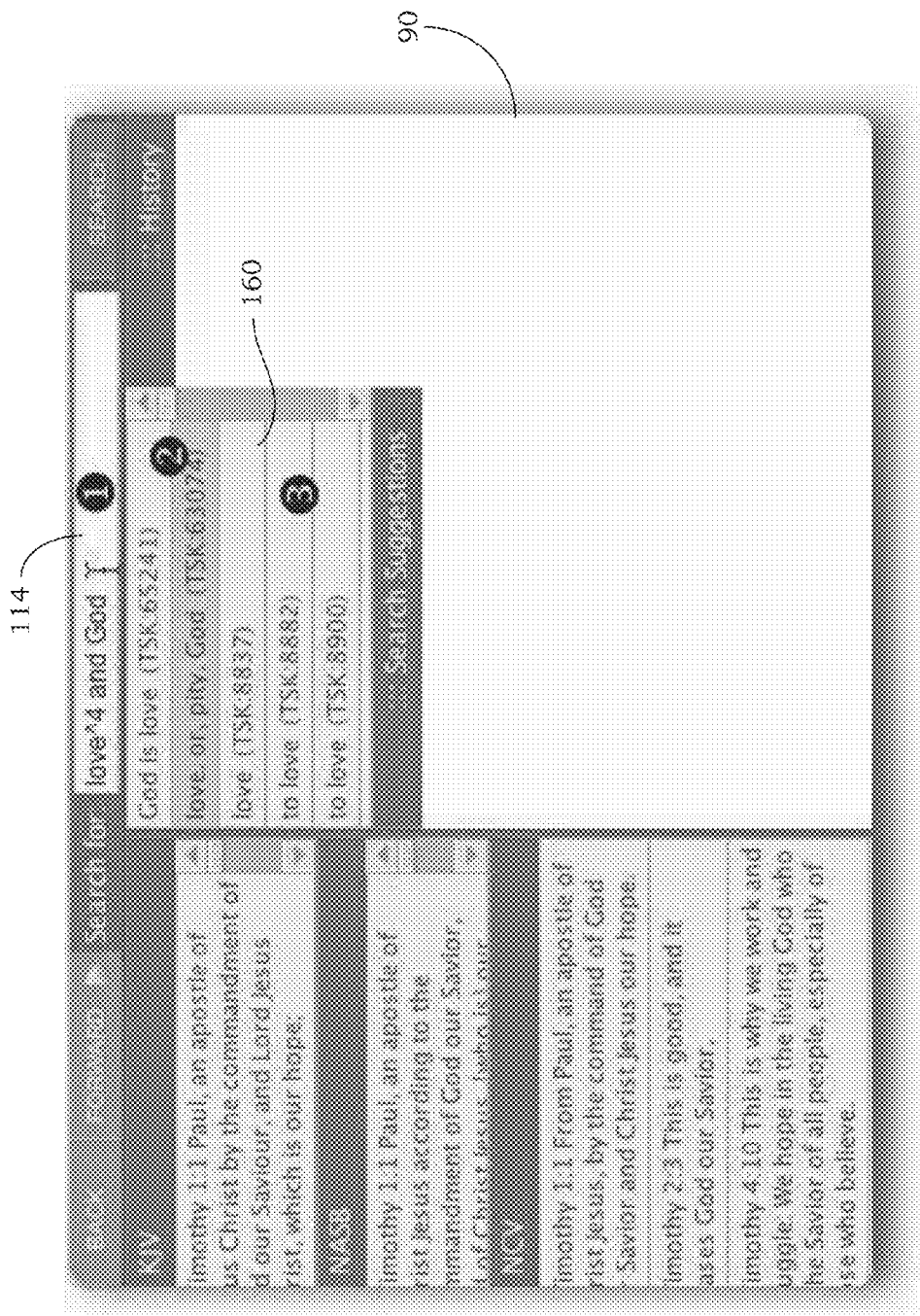

FIG. 26 shows an example of a BOOST search. BOOST searching may be really powerful for those who are doing topical studies (studies about certain ideas or thoughts) or word studies to find out how a word is used with other words. A BOOST search involves adding weight to certain terms in the search and a BOOST factor defines how much more weight is given to certain terms. To perform a BOOST search, the user enter a carat ("^") after a search term followed by the BOOST factor. For example, to search for verses with the terms "love" and "God," where the user wishes to emphasize (or boost) the term "love" by a weight factor of four, the user may enter "love^4 AND God" in the search field 114. This search puts four times more emphasis on the word "love" when ranking the search results in the search suggestion window 160.

Figure 27:
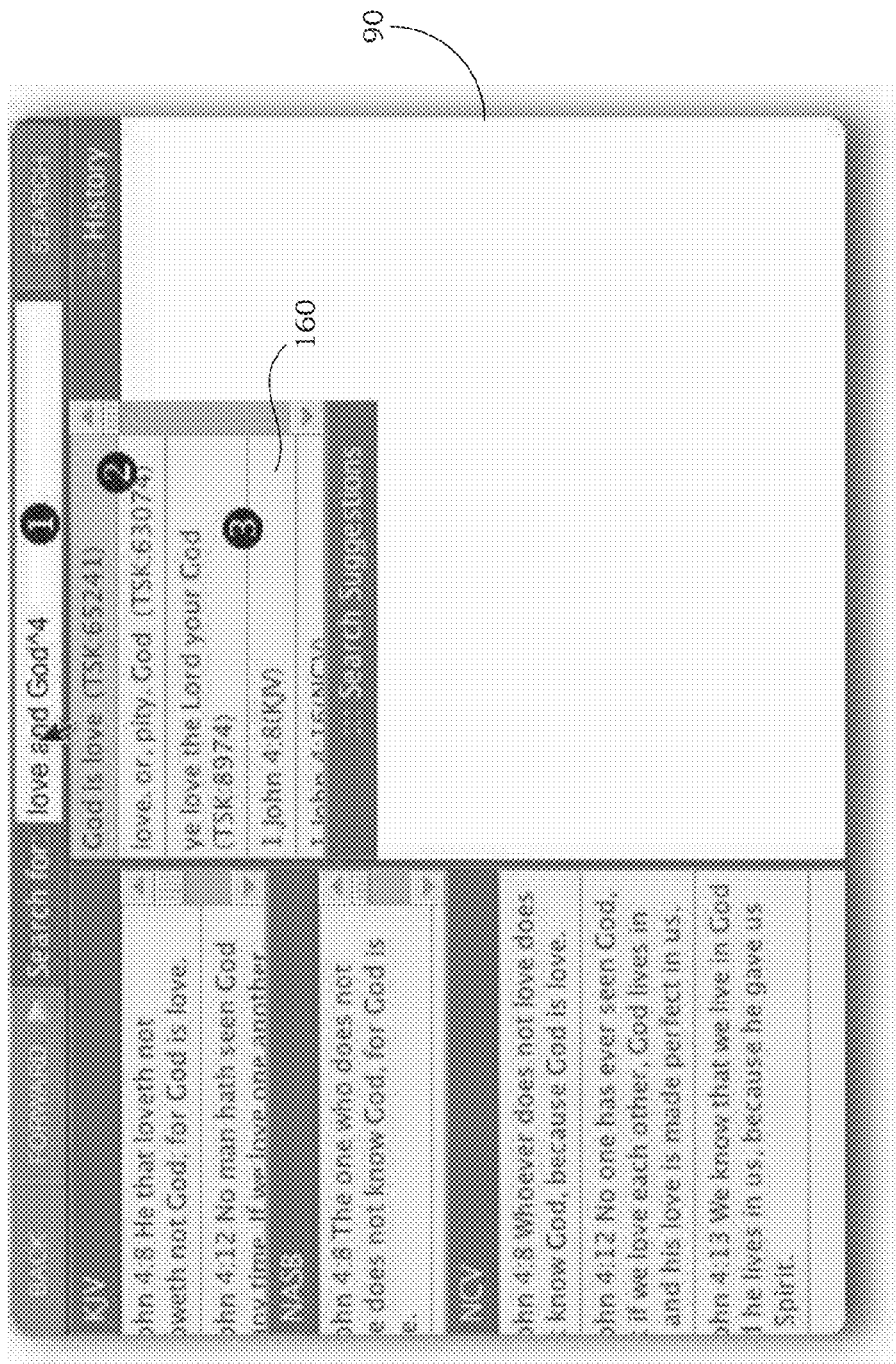

In FIG. 27, the search is changed to put four times more emphasis on God than love. The top two most relevant hits in the search suggestion window 160 happen to be the same as those in FIG. 26, but the search results after the first two demonstrate the effect of the BOOST technology.

The resource diagram tool 30 as described herein may refer to the WordBloom® Advisor software from Visual Study Bible LLC, based in Atlanta, Ga. This software may be accessed using the World Wide Web at the URL http://www-.wordbloom.com. This primary public URL (all other domain traffic may be routed to this URL using web server scripting, to include wordbloom.com traffic) allows visitors and subscribers access to public pages that include marketing information, articles about certain Bible truths, words and issues, articles to instruct and guide the one learning to study, and other general information. Guests may opt to try the applet for a total of 10 actions where an action is defined as a click, search, or similar interactive action. If the guest attempts an 11th action, he or she may be directed to a decision page to decide to either purchase a subscription to WordBloom® or not. If the guest decides not to purchase, he or she will be redirected to the public pages. If the guest decides to purchase, he or she may be directed to a registration web page. Upon completion of registration, an e-mail with an authentication link may be sent to the user. The user may click the authentication link in the e-mail and the browser is returned to WordBloom® Web to login. For example, FIG. 6 includes a username field 134 where the user may enter his or her user name and a password field 136 where the user may enter his or her password. When the user enters the proper login information and presses the login button 138, the login process is complete and the user is forwarded to a purchase page to purchase a subscription using secure pages. The user is then immediate subscribed and access to the resource diagram tool 30 (i.e., WordBloom®) is made available.

The user may also enter the subscription process directly from the public pages using the "Plans and Prices" option 74 which will direct the user immediately to the first step of the purchase routines. Subscribers may utilize the public pages as well as private pages, profiles, and saved studies. Also, subscribers can use the applet (i.e., resource diagram tool 30) without limit throughout the subscription period.

The Search Technology is fully explained in New Technologies and Applications. In brief, there are two processes in the Search Technology, including customized routines to refine and correct user search terms and programmer back-end customizable routines to determine result relevance. A refined term is processed by the Thinkmap® technologies and routines to return results from the Licensed and Proprietary Databases. The distinctions between these two types of data are a matter of copyright and ownership. Licensed data is used by permission under a formal agreement with the owner of the copyright of that data. Licensed data may coexist in a separate data table in a database comprised of both Proprietary and Licensed data. Proprietary Data includes data structures and information redesigned, authored or copyrighted by Visual Study Bible LLC and specifically designed or included in the WordBloom® tool. Thinkmap® technologies may make a request to the Databases maintained on the secure servers searching for data relevant to the refined search term. The data is gathered by the Thinkmap® server side programs and delivered as data entities to the client applet. These entities and the complex relationship are then visualized in simpler manners by way of the applet.

In Bible entities, verses, words, and references are handled by WordBloom® Bible panes that have been designed to organize, present, and make interactive the Bible entities returned by the search and included for visualization. The applet, running in the foreground on the client side, constructs a bloom diagram and presents data entities related to the subject focus element and other entities visually in the bloom. The client's display unit is used to present the data. The entities in the bloom diagram are interactive elements that may be clicked, including the items in the various panes, elements in the bloom diagram around the subject focus element. When selected (e.g., by clicking on a specific entity), the entity becomes the new subject focus element. At this point, the applet has new input and the process begins anew.

In addition to these input, search, research, and display output processes, there are options to share, save, print, and e-mail information from the applet. Depending on a selected option, items may be saved in electronic files, emailed as electronic files, printed as a document, or other action. Studies and words saved electronically may be stored among two tables in a single database. One table may be an index of studies (e.g., study_id) and users (e.g., user_id) associated with the study. The other table may be a listing of study items (e.g., entity_id) catalogued by the study (study_id) to which they are associated. Study items also include fields for comments. Closing the applet concludes the run applet process area and returns the user to the public or subscriber areas.

Figure 28A:
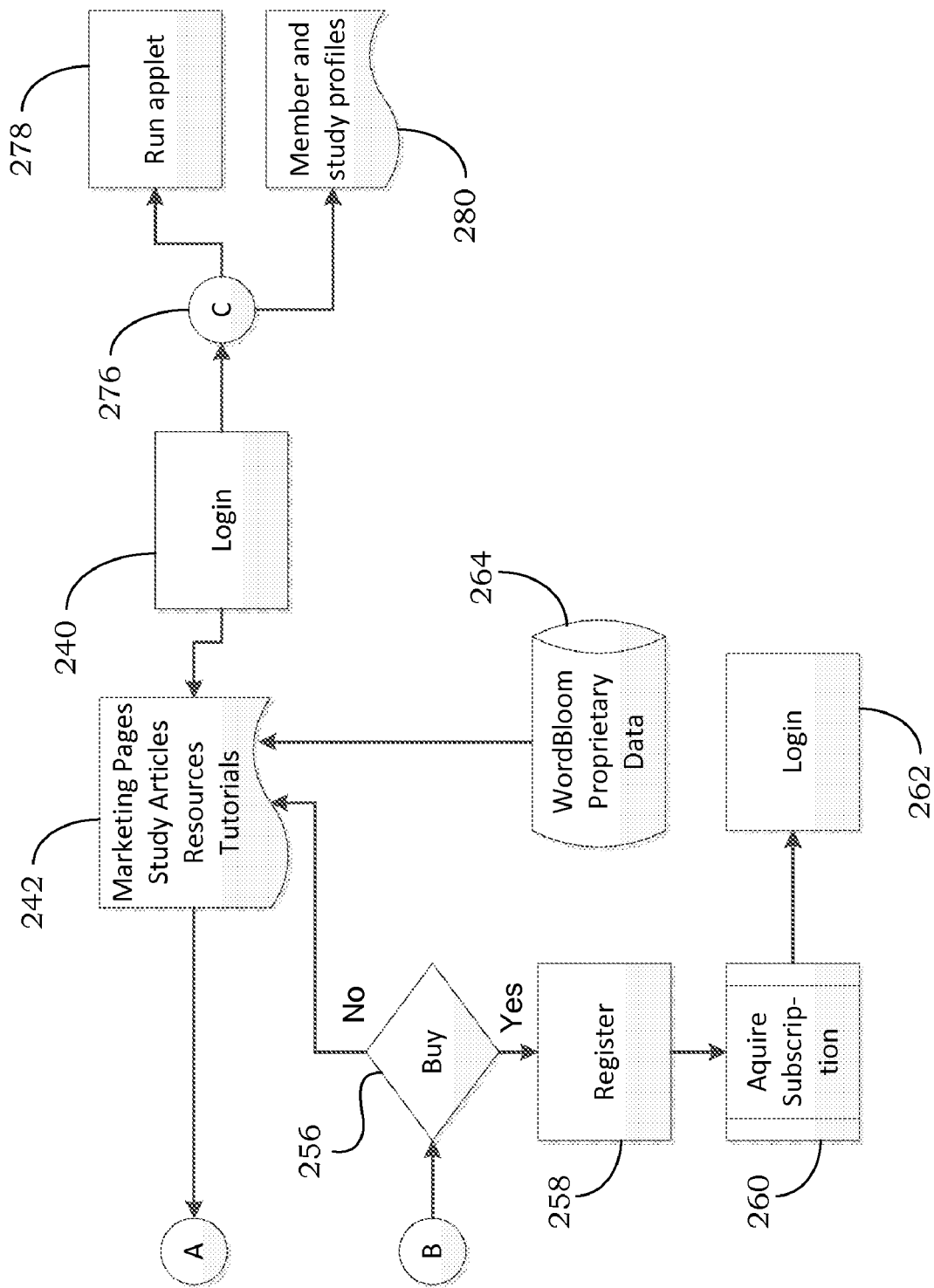
FIGS. 28A and 28B, in combination, illustrate a flow diagram of a method for performing operations with respect to a web site related to the web site management module shown in FIG. 2, according to various implementations.
Figure 28B:
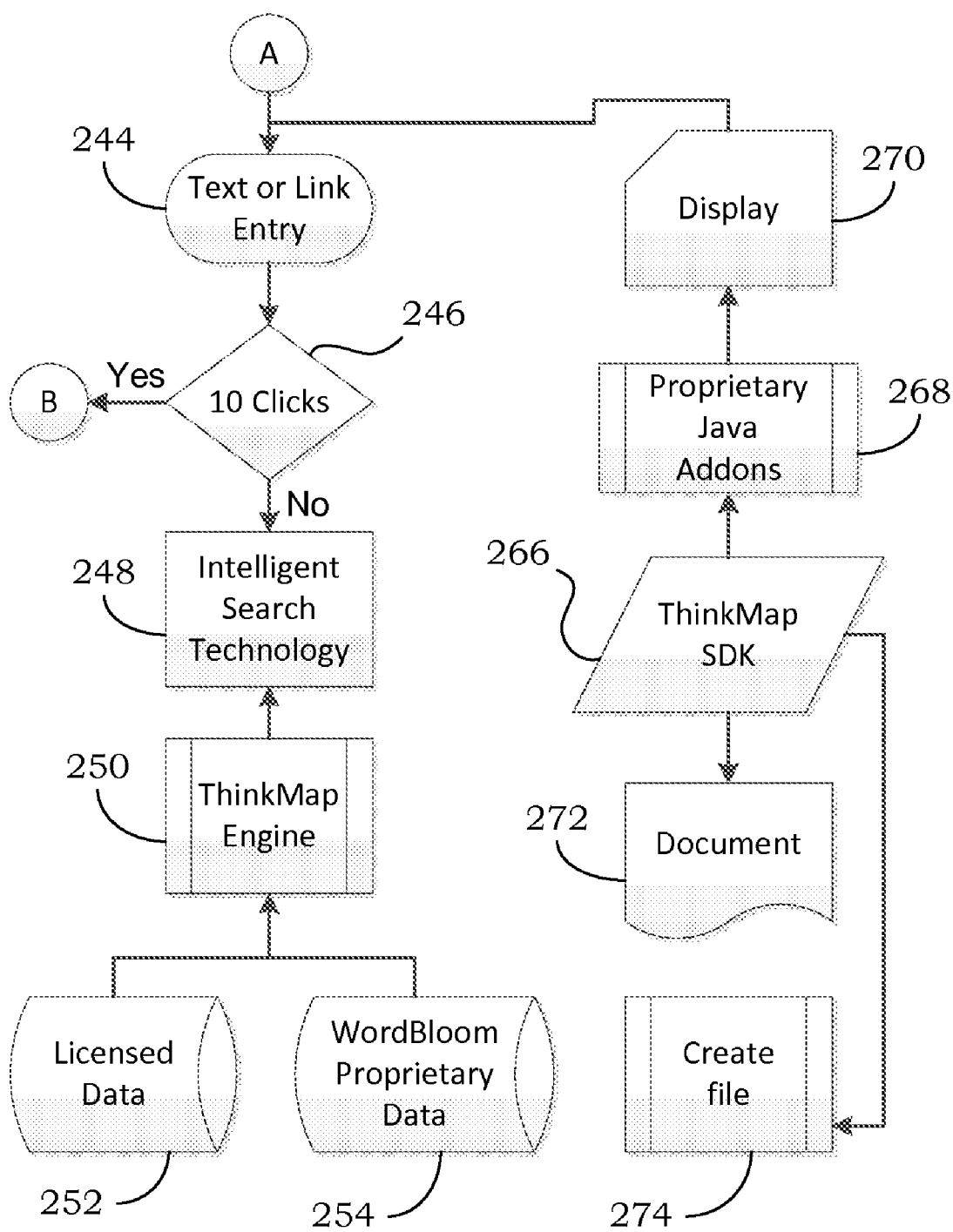

FIGS. 28A and 28B together form a flow diagram showing an embodiment of a method for operating the web site associated with the server 12 shown in FIGS. 1 and 2. As indicated in block 240, a login process is performed on the home page of the web site to allow special access for members. For non-members, the methods proceeds to element 242 and the web page may provide various resources as shown with respect to element 242, including, for example, marketing pages, study articles, resources, and tutorials. A database 244 stores WordBloom® proprietary data that is accessed by the resources 242 to display information to the users. Element 246 indicates the receipt of an input, where the user enters text or a link entry. In decision element 248, the method determines if the user has performed 10 clicks in the trial version of the resource diagram tool 30. If not, the method proceeds to block 250, which indicates that an Intelligent Search Technology is performed. This technology utilizes a ThinkMap engine 252, which accesses data from a licensed data database 254 and from a WordBloom® proprietary data database 256.

If it is determined in decision block 248 that the number of clicks is equal to 10, the method proceeds to decision block 258, which indicates that the user is given an opportunity to buy a subscription. If the user chooses not to purchase, the method returns to element 242. However, it the user chooses to purchase, the method goes to block 260, which includes a registration process. As indicated in block 262, the user acquires a subscription that is set up for the user and the method goes to another login process 264 to allow the user to log in with any membership information.

A ThinkMap SDK 266 may be run to provide proprietary Java add-ons as included in block 268. A display process 270 is performed to show the add-ons on a user interface. At this point, the method returns to element 246 to receive another text entry or link entry. The ThinkMap SDK 266 also produces documents 272.

If a user is a member with an up-to-date subscription, the user may access portions of the web site that are not accessible to non-members. From the initial login process 240, the member may be directed to element 276. In addition, the member may also be directed to element 276 immediately after registering and acquiring a subscription as described with respect to blocks 260 and 262. From element 276, the user has the option to initiate a run process 278 to execute an applet associated with the resource diagram tool 30. Alternatively from element 276, the user may access and/or modify member and study profiles in element 280.

Figure 29:
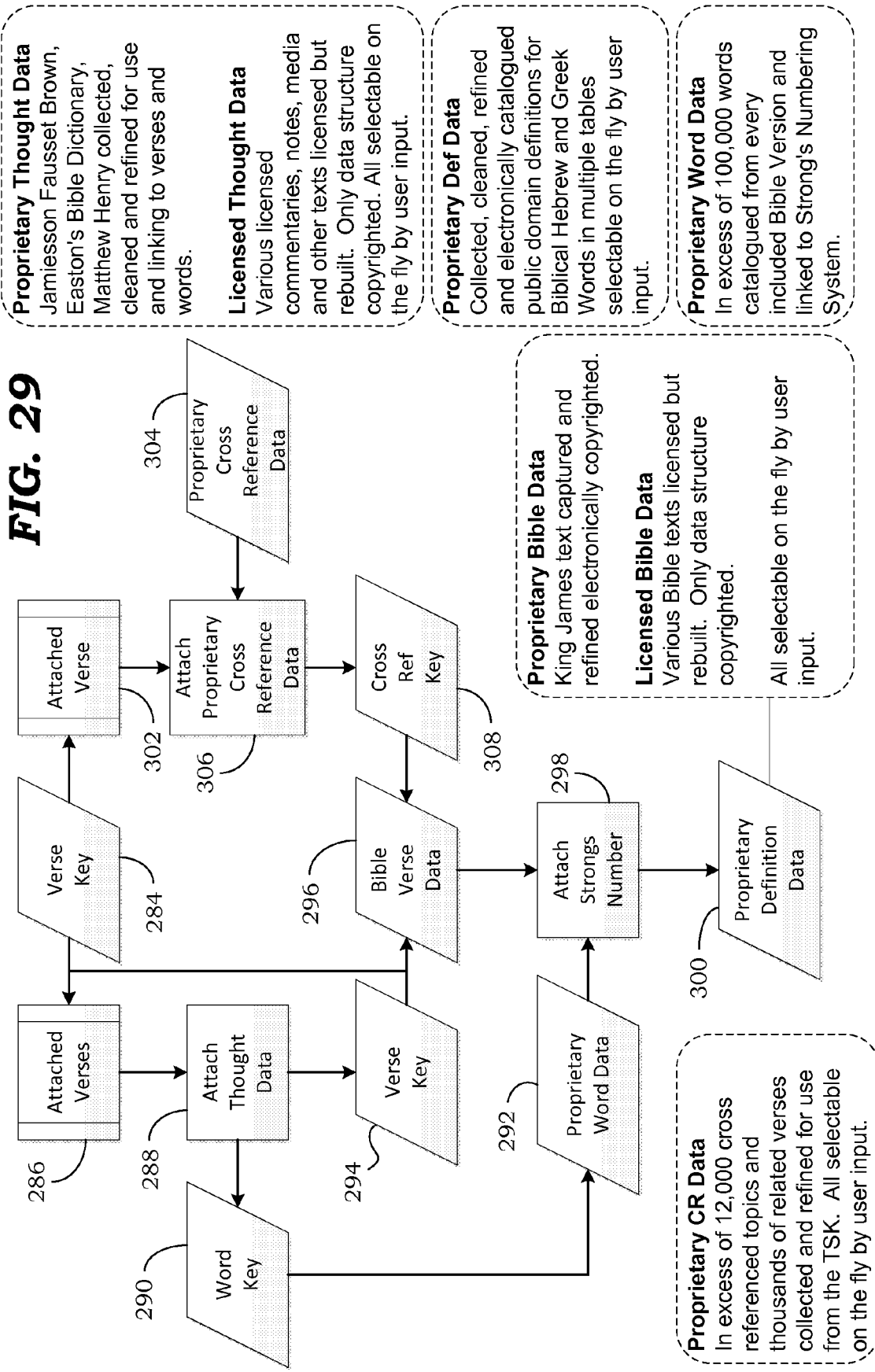
FIG. 29 is a flow diagram illustrating a method for performing operations with respect to the resource diagram tool shown in FIG. 2, according to various implementations.

FIG. 29 illustrates an embodiment of a method for displaying information on a GUI according to operations related to the resource diagram tool 30. In this embodiment, a verse key 284 is used to receive and decode verse entries. In block 286, verses related to the verse entry of key 284 may be attached to the GUI. According to block 288, thought data related to definitions, commentaries, etc. are attached to the GUI. The attached thought data may include, for example, Jamiesson Fausset Brown comments, Easton's Bible dictionary entries, and Matthew Henry comments. The thoughts are edited and refined for use with links to verses and words. The attached though data may also include licensed data, such as, for example, various licensed commentaries, notes, media, and other texts licensed but rebuilt. This data may be for copyrighted data structures. These comments may be selected by specific commands in a user input field.

From the attach thought data block 288, the method may proceed to a word key element 290, which continues with proprietary word data 292. The proprietary word data may include over 100,000 words catalogued from any Bible versions and linked to Strong's Numbering System. From the process of attaching the thought data in block 288, the method may proceed to a verse key 294 input. The input may be Bible verse data 296, for which Strong's Number is attached (block 298). The method may also include providing proprietary definition data 300, which may include collected, cleaned, refined, and electronically catalogued public domain definitions for Hebrew and Greek words found in the Bible. This data may be stored in multiple tables that may be selected by the user as needed.

The method may include attaching a verse 302 and from this point proceeding to proprietary cross-reference data 304. From the attached verse 302 and proprietary cross-reference data 304, the method goes to block 306, which indicates that proprietary cross-reference data is attached in the GUI. In some embodiments, the proprietary cross-reference data may include more that 12,000 cross-referenced topics and thousands of related verses. These topics and verses may be collected and refined for use from the TSK. The cross-reference data may be selected by user input (e.g., clicking on cross-references in a window on the GUI. The cross-references may be presented with a cross reference key 308.

In some embodiments, the elements of FIG. 29 may represent the architecture/structure of the tables, data, indexes and relations of the WordBloom® Proprietary and Licenses Database used by WordBloom® Adviser (i.e., the resource diagram tool 30). There are three core keys (links of common fields) in the proprietary and adapted, licensed data: [strongs numbers], [verse key] and [word key]. Using these keys data is linked from all databases. When a [verse] is in the middle the [verse data] links via [strong number] to [definition] data to find relevant definitions and articles while the same [strong number] is used to find every other occurrences of the [strong number] in [verse] data. Other translations of the [strongs number] are displayed using the [verse key] and [strongs number] key through the [word] data. Based on [verse] data related [thought] and [cross reference] data is displayed. When a [word] or [thought] is in the middle the related [word key] and [verse key] display related [verse] and [definition] and [thought] data.

Users can study, from item to item, branching out and retracting in thought similar to human thought patterns. Mind mapping is not a new method of tracking or visualizing complex and varied tasks but applying mind mapping to the reception of Biblical information is a breakthrough application of science, learning and technology.

WordBloom® Auto Presentation of Word Use brings a tri-lingual Biblical, visual thesaurus showing links to every word focused through common definitions to other English words in the current Bible Versions. Root words (indicated by a dashed line), related words, and translations into the ancient languages are also displayed automatically for every word of focus. WordBloom® also lists Bible Verses in all currently selected Bible Versions that use the English or current Language Word.

Clicking on a definition changes the focus of WordBloom® Adviser to that definition and immediately reverses the above process. Now, the Ancient Language Word becomes the focus and Adviser shows all English translations of that word occurring in the currently selected Bible versions. Two other important steps are also completed. One, WordBloom® Adviser presents a second level of immediate language access by taking those English translations and showing all related Biblical definition nodes. And two, WordBloom® Adviser lists Bible Verses in all currently selected Bible Versions that use the Ancient Language Word. This thesaurus, translation, tri-lingual process is facilitated by a proprietary, first edition word database that connects all biblical words with multiple definitions and multiple synonyms in Ancient and English or other current languages.

The resource diagram tool 30 is built upon custom relational databases. WordBloom® relies on highly structure databases designed by: system database analysts, Bible research and text professionals, theologians, and learning professionals. The databases have all been custom built from the ground up making ancient and trusted Biblical research materials and publications accessible to 21st century technology. The WordBloom® Research Team assembled tens of thousands of pages and hundreds of thousands of cross references and then designed data structures and systems allowing people to "see the Bible texts" and their interrelations.

There are two key processes to the WordBloom® Intelligent Search Technology (also, Intelligent Search, Intelligent Search Box): customized routines to refine and correct user search terms, and programmer, backend customizable routines to determine result relevance. Intelligent Search applies to the user initiated search but not to the search for related items displayed in other WordBloom® Adviser areas.

User search terms are captured and subjected to customized parsing and verification before passing the search term to the Thinkmap® search procedures. The following are examples of, but not fully inclusive of all, implementations of this technology: checking, correcting and parsing partial or full Bible book names to function efficiently in the search process; determining if search items are words or verses using specialized terms such as using the colon as a verse identifier; allowing for specific New or Old Testament searches of terms using specialized identifiers such as ":NT" or ":OT"; and limiting or including database tables to be included in search based on type of search term entered.

Customized relevance factors are determined and implemented along with standard Thinkmap® processes to track, rate, and determine the relevance of search results for any given term. The following are examples of, but not fully inclusive of all, factors used in this process: an exact match of the term, if found, will be centered and become the basis for constructing the bloom and finding other related reference materials; if search term is a word and found in the WordBloom® proprietary word databases, then the result from that data will be centered above all other results; number of user hits and selections previously recorded; table from which the result originates; number of times the term occurs in the result; and closeness to original spelling of search term. Results are then ranked and included in the "Suggestions" search pull down pane allowing the user to see other interesting and optional searches.

Until now, the public domain Treasury of Scripture Knowledge data has been searchable only from a reference verse to destination verses through topics appearing in the source verse. The WordBloom® Research Team has applied new technologies to bring native access to the topics of the TSK allowing them to become the source of a study or focus.

The system uses Native Strong's Number Access to Vines Dictionaries. The WordBloom® Research Team redesigned data and access architectures to allow native access to Strong's Concordance and Dictionary Numbers found in Vine's (public domain) Definitions. This new architecture allows a user direct, contextual access to all Vines definitions for all Greek words related to any single English Word that becomes the center of focus. It also allows for Vines to be directly linked to all Strong's Numbered resources.

WordBloom® builds a Bloom of resources related to the word, verse, definition or thought that is the focus (or center) of the study. Blooms can be shared via email using the Share feature of the WordBloom® Adviser. The following steps complete this email sharing process.

The applet, running on the client computer, forwards a jpeg format file image of the currently displayed bloom to the server while executing a server request. The server request results in the launching of a webpage, including the forwarded image, that allows for the entry and conventional verification of "To" and "From" email addresses. The webpage also allows for the entry of a short message to the recipient address. Upon clicking the "Send Email" or equivalent link, the server executes the send mail routine and forwards the email using SMTP to recipient.

Bloom emails are clickable linking to WordBloom® Web and automating the process of entering the "bloom focus" (the item in the center of the bloom) into the WordBloom® Search box. WordBloom® Adviser is an applet (small, compact program).

Embodiments also exist that employ other technologies that both improve and restrict the methods with which desktop based and internet based technologies and programs are deployed (including but not limited to the methods of using "cookies", JAVA, Thinkmap®and other technologies). Thus, other technologies for accomplishing the above functions are available to enhance, launch, run or distribute WordBloom® Web and Adviser. WordBloom® may also be deployed using technologies in addition to the above technologies, without replacing those technologies in some embodiments, such as a smart phone or iPhone deployment of WordBloom®.

There are varying methods of purchase and use, to include the registration process and internet access, that can facilitate the distribution and use of WordBloom® like iPhone, desktop operating system and any other method of processing searches and presenting the complex relationships of Bible and other resource data visibly and simply.

Proprietary data and data used under licensing agreements may be added to, reduced, or substituted without affecting WordBloom®.

The "look and feel" of WordBloom® is further customized in other implementations. Thus, the WordBloom® Web or Adviser may be enhanced to provide the best user experience as deemed appropriate by Visual Study Bible LLC. For example, in other implementations, ZOOMability includes the ability to not only limit the number of visually presented entities but also to turn on and off tools, databases and data tables to provide user customization of WordBloom®.

Use of WordBloom® as a "study launcher" or guide for individuals and groups includes articles, studies, guides and pre-planned study materials such as graded education plans, small group guides or historical or education modules.

Sharing and saving studies and study lists, as well as individual results, from WordBloom® Web or WordBloom® Adviser are limitless. In other implementations, sharable studies can be sent via email from WordBloom® Web or WordBloom® Adviser and are interactive in that the visual presentations (bloom, list, items, links, etc.) can be selected and electronically or otherwise link to other WordBloom® Web or WordBloom® Adviser pages, applets, panes, etc. to automatically provide input to or launch WordBloom® Web or WordBloom® Adviser features, pages or applets. The interactive abilities of Sharing are extensive. The saving of comments, notes, summaries and other user initiated text for blooms, studies, study items, study lists, etc. provide a customizable and quick study enhancement.

The automatic launching of the WordBloom® Adviser (applet) from sharable or linkable items is an important implementation of WordBloom® allowing for a rich, interactive experience for the user requiring the least steps possible. For example, WordBloom® has the ability to have a referral email take the guest to a "Welcome" web page providing a simple explanation of the product and then automatically launching the applet for the guest only to offer the purchase or a polite "Thanks for stopping by . . . " web page upon termination of the visit.

In other implementations, WordBloom® is used to present, study and research reference and searchable data from alternate data sources for other religions, religious studies, and other fields of study. It is also usable by people in other religions and fields of study in its current form to study Biblical reference data.

Other embodiments and implementations included within the scope of this disclosure do not include all of the above-described features. Instead, the scope of this disclosure includes any combination of elements and features described above.

With WordBloom®, no one has to be an expert on how or when to use a particular study tool or resource. WordBloom® becomes the expert with its incredible application of cutting edge technology and incredible resources. The core resources are the classics—the long trusted works at the core of every good study program and every good study software—but WordBloom® uses them in new ways in combination with brand new tools and technologies. The end result is that you can spend your time understanding God's word instead of flipping pages, picking sites and figuring out how to use each book. Here is a current list and explanation of the resources expertly incorporated or invented to achieve WordBloom®'s expert status.

All Bible versions are complete with Strong Greek and Hebrew Numbering (Strong's Numbers have been adapted to the contemporary language versions).

Type of Translation: Thought for Thought, Dynamic Equivalent
Publisher: Thomas Nelson
Publication Date: 2005
This English, twentieth century, contemporary translation is widely used by conservative evangelists trying to help people understand the Bible in their own dialect and language. The WordBloom® Resource Council in combination with Independent Bible Reviewers and trusted sources, such as the Billy Graham Evangelistic Association, confirm that this translation is one of the best contemporary translations both accurate and trustworthy.

The translation team was composed of the World Bible Translation Center and fifty additional, highly qualified and experienced Bible scholars and translators was assembled. The team included people with translation experience on such accepted versions as the New International Version, the New American Standard Bible, and the New King James Version. The most recent scholarship and the best available Hebrew and Greek texts were used, principally the third edition of the United Bible Societies.

The NASB:
Type of Translation: Word for Word, Language Accuracy
Publisher: Lockman Foundation
Publication Date: 1995
There is no doubt that the New American Standard Bible (NASB) is second only to the King James in use and acceptance amongst Biblical Scholars. It helps the reader understand the words that were recorded in the original languages. The NASB has earned the reputation of being the most accurate English Bible translation, revealing what the original manuscripts actually say. Recent research on the oldest and best Greek manuscripts of the New Testament has been reviewed, and some passages have been updated for even greater fidelity to the original manuscripts. NASB has a long tradition of being a literal translation of the original Greek and Hebrew without compromise. The translators and consultants who have contributed to the NASB update are conservative Bible scholars who have doctorates in Biblical languages, theology, or other advanced degrees. They represent a variety of denominational backgrounds.

The King James Bible:
Type of Translation: Word for Word, Language Accuracy
Publisher: Public Domain
In 1604, King James I of England authorized that a new translation of the Bible into English be started. It was finished in 1611, just 85 years after the first translation of the New Testament into English appeared (Tyndale, 1526). The Authorized Version, or King James Version, quickly became the standard for English-speaking Protestants. Its flowing language and prose rhythm has had a profound influence on the literature of the past 300 years. The KJV is public domain in the United States.

The Visual Biblical Thesaurus allows you to see the links from English through Hebrew/Greek Dictionaries to English Synonyms and their locations in the Bible text. This never before seen resource also shows you Hebrew/Greek synonyms through English concordances. The Strong's Definitions and Vines New Testament Dictionary are used with WordBloom® Custom Concordances (what words appear where in the Bible) for each version of the Bible to create the data for the Thesaurus. Cross reference works take an idea from one part of Scripture and help the reader located other parts of Scripture (references) that are similar or like the original idea. Some cross references are simply word based. For example, "dog" occurs in x passage and also in y passage. The cross reference for "dog" to y passage shows when the user is reading x passage. Other cross reference works are based on thoughts or topics. These topical cross references include classics like Treasury of Scripture Knowledge and Naves Topical Bible. These take a thought from a current verse and show other verses that illustrate the same thought.

Strong's Exhaustive Concordance KJV (Words):

Produced by James Strong these concordances identify every location of every word in the Bible. They are in the public domain.

WordBloom®'s Exhaustive Concordance NASB (Words):

Created by Visual Study Bible LLC in 2009 this concordance identifies every location of every word in the New American Standard Version (1995) of the Bible and identifies the appropriate Strong's Number for the Hebrew/Greek Definition/Root Definition for those words. This work is a derivative work of a broader public domain project to identify Strong's Definitions related to individual phrases.

WordBloom®'s Exhaustive Concordance NCV (Words):

Created by Visual Study Bible LLC in 2009 this concordance identifies every location of every word in the New Century Version of the Bible and identifies the appropriate Strong's Number for the Hebrew/Greek Definition/Root Definition for those words.

WordBloom®'s Every Word Concordance for All Versions (words). This public domain resource provides a quick method of finding all relevant words in all versions of the Bible currently used by WordBloom®.

Treasury of Scripture Knowledge—WordBloom® Edition (topics). This now public domain resource was developed generations ago by R. A. Torrey from references in Thomas Scott's Commentary and the Comprehensive Bible. It identifies over 40,000 topics that occur in Bible verses and links them. For example, TSK lists the following topics for Genesis 1:1: beginning; and, God. For each of those topics, TSK lists other Bible verses that speak of beginning and God. The logic is: find a verse, identify the topics, find other verses that help me understand or teach me more. Visual Study Bible LLC adapted, refined and recreated TSK to unlock the additional power of searching the Bible by TSK topics and finding verses that TSK identified as similar.

Ryrie Notes and References (Topics from Verses):

This resource helps explain interesting topics and identifies cross references to those topics. This resource is utilized in by WordBloom® in both the Cross Reference and Thought areas. Charles C. Ryrie's years of study, teaching and writing make him exceptionally qualified to help readers grasp the Bible's fundamental truths. Expanded in 1995, Ryrie's work features 10,000 concise explanatory notes and includes an amazing array of other indispensable information that is acclaimed for its scholarly nature yet understandable, easy-to-read format. Unchanged is Ryrie's characteristic fearless confrontation of some of today's more controversial verses. This work is very clear in presenting literal understandings of passages sometimes dismissed as embellishments of the truth, and rightly defends the inspiration and infallibility of Scripture.

Strong's Hebrew and Greek Dictionary:

Both dictionaries were published along with Strong's Exhaustive Concordance in 1890. These dictionaries have been the tried, true and tested standard for Bible dictionaries will most surviving and contemporary Hebrew and Greek dictionary works adapting to Strong's and his numbering system. These dictionaries catalogue: 8674 Hebrew Root Words; and, 5624 Greek Root Words.

Vines Dictionary of New Testament:

This is a reference guide to New Testament Greek words for English readers. It explains the meaning of the original Greek with the added dimension of the context of the Greek word. For example: In English, the Bible only uses one word for "love," but in New Testament Greek there are four (two being used most often). So Vines fills the gap between the Bible in English and the original New Testament Greek nicely and effectively. Vines also provides the definition of a word (as used in the King James Version (KJV)) more accurately than an English dictionary, because it expands the Greek use of the word.

Easton's Bible Dictionary:

The encyclopedia by Matthew George Easton, M. A., D. D. (1823-1894) was published in 1897 by Thomas Nelson. It is a public domain resource. Despite its name, many of the entries in Easton's are encyclopedic in nature, though there are also short, dictionary-like entries. It contains nearly 4,000 entries. Easton's is a classic resource amongst Bible scholars and educators.

Matthew Henry's Commentary:

This resource was published in 1811 and has been for generations the cornerstone of applied Bible truth. Matthew Henry was a non-conformist and created a commentary that allowed people to understand the Bible. His was an original work and even though wordy and written in old English, it is still a standard in personal Bible commentaries.

Ryrie Study Notes and Commentary:

This resource helps explain interesting topics and identifies cross references to those topics. This resource is utilized in by WordBloom® in both the Cross Reference and Thought areas. Charles C. Ryrie's years of study, teaching and writing make him exceptionally qualified to help readers grasp the Bible's fundamental truths. Expanded in 1995, Ryrie's work features 10,000 concise explanatory notes and includes an amazing array of other indispensable information that is acclaimed for its scholarly nature yet understandable, easy-to-read format. Unchanged is Ryrie's characteristic fearless confrontation of some of today's more controversial verses. This work is very clear in presenting literal understandings of passages sometimes dismissed as embellishments of the truth, and rightly defends the inspiration and infallibility of Scripture.

Jamieson, Fausset and Brown Commentary:

Long considered one of the best conservative commentaries on the entire Bible, the Jamieson-Fausset-Brown Bible Commentary, published in 1871, offers practical insight from a Reformed Evangelical perspective. The comments are an insightful balance between learning and devotion, with an emphasis on allowing the text to speak for itself. Volume one covers Genesis through Esther, volume two covers Job through Malachi, and volume three covers the entire New Testament (Matthew through Revelation). Introductions are offered for the Pentateuch, the Mosaic account of creation, Hebrew poetry, and for each book in the Old Testament, as well as for the gospels, Acts, Romans, and the entire corpus of the epistles.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and subcombinations of all elements, features, and aspects discussed above. All such modifications and variations are intended to be included herein within the scope of the present disclosure, and all possible claims to individual aspects or combinations of elements or steps are intended to be supported by the present disclosure.

We claim:

1. A graphical user interface on a computer comprising:
   a search field configured to enable a user to enter a search term, the search term being recognized as a subject focus element;
   a bloom diagram window configured to display an initial bloom diagram having the subject focus element at a center location and resource elements related to the subject focus element at locations surrounding the center location;
   a passage window configured to display one or more passages of a classic literary work, the passages related to the subject focus element; and
   a resource window configured to display a description of the resource elements, wherein the resource window comprises a cross-reference pane configured to display passages of the classic literary work and topics related to the search term, a definition pane configured to display definitions of the subject focus element and definitions of words related to the subject focus element, and a thoughts pane configured to display commentaries and notes from respected scholars, and
   wherein one or more of the resource elements are represented as dots, wherein dots are visually coded to correspond to one of the cross-reference pane, the definition pane, and the thoughts pane.

2. The graphical user interface of claim 1, wherein at least one of the resource elements includes a link, each link being configured to enable the user to select one of the resource elements as a new subject focus element, the bloom diagram window being further configured to remove the initial bloom diagram and display a new bloom diagram with the new subject focus element displayed at the center location and new resource elements related to the new subject focus element at locations surrounding the center location.

3. The graphical user interface of claim 1, wherein the bloom diagram includes lines drawn from the subject focus element at the center location to the resource elements.

4. The graphical user interface of claim 3, wherein the bloom diagram further displays second-level resource elements related to and surrounding one or more of the resource elements.

5. The graphical user interface of claim 1, further comprising a 3D button enabling the user to select a 3D mode, wherein the bloom diagram window is configured to display the initial bloom diagram three-dimensionally when the 3D mode is selected.

6. The graphical user interface of claim 1, wherein the classic literary work is the Bible, and the passage window includes one or more Bible version panes, each Bible version pane configured to display Bible verses in accordance with a specific Bible translation version.

7. The graphical user interface of claim 6, wherein the subject focus element is a word and each Bible version pane is configured to display one or more Bible verses that include the word.

8. The graphical user interface of claim 7, wherein the word is a Hebrew or Greek word.

9. The graphical user interface of claim 6, wherein the subject focus element is a subject Bible verse and each Bible version pane is configured to display a number of Bible verses preceding the subject Bible verse, the subject Bible verse, and a number of Bible verses following the subject Bible verse.

10. The graphical user interface of claim 1, wherein the subject focus element is a cross-reference element selected from the cross-reference pane or from a dot representing the respective cross-reference element, and wherein the resource elements in the bloom diagram include passages of the classic literary work related to the cross-reference element.

11. The graphical user interface of claim 1, wherein the subject focus element is an English word and the resource elements include one or more Greek or Hebrew words that are translated into the English word, definitions of the English word, and commentaries, notes, or thoughts from respected scholars.

12. The graphical user interface of claim 1, wherein the subject focus element is a Greek or Hebrew word and the resource elements include one or more English words translated from the Greek or Hebrew word.

13. The graphical user interface of claim 1, wherein the subject focus element is a Bible verse and the resource elements include English words found in the Bible verse, definitions of the English words, cross-reference elements of the English words, and commentaries, notes, or thoughts from respected Bible scholars.

* * * * *